US011338209B2

(12) United States Patent
Gordon, Jr.

(10) Patent No.: US 11,338,209 B2
(45) Date of Patent: May 24, 2022

(54) METHODS, SYSTEMS, APPARATUSES, AND DEVICES FOR FACILITATING CONDUCTING A COMPETITION BETWEEN PARTICIPANTS

(71) Applicant: Brayard Daniel Gordon, Jr., Bronx, NY (US)

(72) Inventor: Brayard Daniel Gordon, Jr., Bronx, NY (US)

(73) Assignee: MC MASTER OF CEREMONY INC, Bronx, NY (US)

( * ) Notice: Subject to any disclaimer, the term of this patent is extended or adjusted under 35 U.S.C. 154(b) by 0 days.

(21) Appl. No.: 17/239,480

(22) Filed: Apr. 23, 2021

(65) Prior Publication Data

US 2021/0331077 A1 Oct. 28, 2021

Related U.S. Application Data

(60) Provisional application No. 63/014,598, filed on Apr. 23, 2020.

(51) Int. Cl.
*A63F 13/795* (2014.01)
*A63F 13/798* (2014.01)

(52) U.S. Cl.
CPC .......... *A63F 13/795* (2014.09); *A63F 13/798* (2014.09); *A63F 2300/407* (2013.01); *A63F 2300/5546* (2013.01)

(58) Field of Classification Search
CPC ...... A63F 13/795; A63F 13/798; A63F 13/86; A63F 13/87; A63F 13/814; A63F 13/65;
(Continued)

(56) References Cited

U.S. PATENT DOCUMENTS 10,035,068 B1 *  7/2018  Wakeford ............... H04L 67/38
10,368,134 B2 *  7/2019  Wagner ................. H04N 21/436
(Continued)

OTHER PUBLICATIONS

Talent Joe Talent Contests, https://www.talentjoe.com/index.php/contests.
WWMC, https://worldwidemusicontest.com/.

*Primary Examiner* — Michael A Cuff

(57) ABSTRACT

Disclosed herein is a method of facilitating conducting a competition between participants, in accordance with some embodiments. Accordingly, the method comprises receiving a registration request from a participant device, registering a participant, identifying first participants, transmitting a participant list to the participant device, receiving a selection of a first participant from the participant device, generating a challenge notification, transmitting the challenge notification to a first participant device, receiving participant content from the participant device, receiving first participant content from each first participant device, analyzing the participant content and the first participant content, selecting a participant content and a first participant, transmitting the participant content and the first participant content to a viewer device, receiving a score for each of the participant and the first participant from the viewer device, analyzing the score, determining a winner of the competition, generating a reward for the winner, and storing the reward.

18 Claims, 38 Drawing Sheets

(58) Field of Classification Search
CPC .................. A63F 13/352; A63F 13/216; A63F 2300/5546
USPC ......................................................... 463/42
See application file for complete search history.

(56) References Cited

U.S. PATENT DOCUMENTS

| | | | |
|---|---|---|---|
| 10,576,379 B1 * | 3/2020 | Wakeford | A63F 13/285 |
| 10,747,807 B1 * | 8/2020 | Garg | G06F 3/04883 |
| 2006/0258463 A1 * | 11/2006 | Cugno | A63F 13/795 463/42 |
| 2008/0172137 A1 | 7/2008 | Safina | |
| 2014/0206449 A1 | 7/2014 | Alman | |
| 2019/0073666 A1 | 3/2019 | Ortiz | |
| 2019/0199759 A1 * | 6/2019 | Anderson | H04L 67/306 |
| 2020/0193239 A1 * | 6/2020 | Wilson | G06F 16/38 |
| 2021/0157844 A1 * | 5/2021 | Andon | G06F 1/1694 |
| 2021/0264541 A1 * | 8/2021 | Li | G06Q 10/10 |
| 2021/0287118 A1 * | 9/2021 | Pierce | A63F 13/795 |

* cited by examiner

OVERALL SCORE FOR ARTIST A OF ROUND 1:6

YOU FIND THIS OUT BY ADDING ALL ROUND 1 ARTIST A SCORE FROM EACH FAN IN THE CURRENT CONTEST & DIVIDE BY 4 (THE AMOUNT OF FANS IN THE CURRENT CONTENT)

OVERALL SCORE FOR ARTIST A OF ROUND 1:4.75

YOU FIND THIS OUT BY ADDING ALL ROUND 1 ARTIST A SCORE FROM EACH FAN IN THE CURRENT CONTEST & DIVIDE BY 4 (THE AMOUNT OF FANS IN THE CURRENT CONTENT)

OVERALL SCORE FOR ARTIST A OF ROUND 2:7

YOU FIND THIS OUT BY ADDING ALL ROUND 2 ARTIST A SCORE FROM EACH FAN IN THE CURRENT CONTEST & DIVIDE BY 4 (THE AMOUNT OF FANS IN THE CURRENT CONTENT)

OVERALL SCORE FOR ARTIST A OF ROUND 2:6.5

YOU FIND THIS OUT BY ADDING ALL ROUND 2 ARTIST A SCORE FROM EACH FAN IN THE CURRENT CONTEST & DIVIDE BY 4 (THE AMOUNT OF FANS IN THE CURRENT CONTENT)

OVERALL SCORE FOR ARTIST A OF ROUND 3:5.25

YOU FIND THIS OUT BY ADDING ALL ROUND 3 ARTIST A SCORE FROM EACH FAN IN THE CURRENT CONTEST & DIVIDE BY 4 (THE AMOUNT OF FANS IN THE CURRENT CONTENT)

OVERALL SCORE FOR ARTIST A OF ROUND 3:6.75

YOU FIND THIS OUT BY ADDING ALL ROUND 3 ARTIST A SCORE FROM EACH FAN IN THE CURRENT CONTEST & DIVIDE BY 4 (THE AMOUNT OF FANS IN THE CURRENT CONTENT)

METHODS, SYSTEMS, APPARATUSES, AND DEVICES FOR FACILITATING CONDUCTING A COMPETITION BETWEEN PARTICIPANTS

The current application claims a priority to the U.S. provisional patent application Ser. No. 63/014,598 filed on Apr. 23, 2020.

FIELD OF THE INVENTION

Generally, the present disclosure relates to the field of data processing. More specifically, the present disclosure relates to methods, systems, apparatuses, and devices for facilitating conducting a competition between participants.

BACKGROUND OF THE INVENTION

A system for facilitating an online competition is in demand. As internet technology continues to evolve, online systems are reinventing many aspects of everyday life. Doing business and finding merchandise and jobs are all changing in part because of online systems development.

Internet technology allows the public to engage in creative tasks, including music creation and publishing. Over recent decades, the first step in creating music has relied on computer-based and digital technology. The Internet provides online mechanisms that allow individuals to download and use software to record and produce original music.

The Internet also helps businesses to identify and track the behavior of online consumers in considerable detail, and thus, it offers a valuable resource for advertising goods and services.

An online system that can provide unique entertainment content or competition similar to that found in a television program may draw online consumers to a particular website; in turn, this can set the stage for reaping the benefits of increasing online interactivity and advertising.

The Internet may facilitate greater participation in talent competitions than an ordinary television program because it offers no physical limitations in terms of location, meaning that contestants can easily input or upload their creations or feedback online. Moreover, an online system can be used to recruit talent and can employ public voting. However, currently developed online systems for music competition do not make user participation convenient and generally lack reward mechanisms for the winners. Thus, there is a need to develop a more unique and advanced system for businesses and individuals to discover, develop, and promote musical talent.

Therefore, there is a need for improved methods, systems, apparatuses, and devices for facilitating conducting a competition between participants that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a method of facilitating conducting a competition between participants, in accordance with some embodiments. Accordingly, the method may include a step of receiving, using a communication device, a registration request from a participant device associated with a participant. Further, the method may include a step of registering, using a processing device, the participant to the competition based on the registration request. Further, the method may include a step of identifying, using the processing device, a plurality of first participants from a plurality of primary first participants associated with the competition. Further, the method may include a step of transmitting, using the communication device, a participant list comprising the plurality of first participants to the participant device. Further, the method may include a step of receiving, using the communication device, a selection of at least one first participant of the plurality of first participants from the participant device. Further, the participant challenges the at least one first participant to the competition. Further, the method may include a step of generating, using the processing device, a challenge notification for the competition between the participant and the at least one first participant based on the selection of the at least one first participant. Further, the method may include a step of transmitting, using the communication device, the challenge notification to at least one first participant device associated with the at least one first participant. Further, the method may include a step of receiving, using the communication device, a plurality of participant content associated with the participant from the participant device. Further, the method may include a step of receiving, using the communication device, a plurality of first participant content associated with each first participant of the at least one first participant from each first participant device of the at least one first participant device. Further, the method may include a step of include analyzing, using the processing device, the plurality of participant content and the plurality of first participant content based on at least one artificial intelligence model. Further, the method may include a step of selecting, using the processing device, at least one participant content from the plurality of participant content and at least one first participant content from the plurality of first participant content based on the analyzing of the plurality of participant content and the plurality of first participant content. Further, the method may include a step of transmitting, using the communication device, the at least one participant content and the at least one first participant content to at least one viewer device associated with at least one viewer. Further, the method may include a step of receiving, using the communication device, a score for each of the participant and the at least one first participant from the at least one viewer device. Further, the method may include a step of analyzing, using the processing device, the score for each of the participant and the at least one first participant. Further, the method may include a step of determining, using the processing device, a winner of the competition from the participant and the at least one first participant based on the analyzing of the score. Further, the method may include a step of generating, using the processing device, a reward for the winner based on the determining. Further, the method may include a step of storing, using a storage device, the reward.

Further disclosed herein is a system for facilitating conducting a competition between participants, in accordance with some embodiments. Accordingly, the system may include a communication device, a processing device, and a storage device. Further, the communication device may be configured for receiving a registration request from a participant device associated with a participant. Further, the communication device may be configured for transmitting a participant list comprising a plurality of first participants to the participant device. Further, the communication device may be configured for receiving a selection of at least one first participant of the plurality of first participants from the participant device. Further, the participant may challenge the at least one first participant to the competition. Further, the communication device may be configured for transmitting a challenge notification to at least one first participant device associated with the at least one first participant. Further, the communication device may be configured for receiving a plurality of participant content associated with the participant from the participant device. Further, the communication device may be configured for receiving a plurality of first participant content associated with each first participant of the at least one first participant from each first participant device of the at least one first participant device. Further, the communication device may be configured for transmitting at least one participant content and at least one first participant content to at least one viewer device associated with at least one viewer. Further, the communication device may be configured for receiving a score for each of the participant and the at least one first participant from the at least one viewer device. Further, the processing device may be communicatively coupled with the communication device. Further, the processing device may be configured for registering the participant to the competition based on the registration request. Further, the processing device may be configured for identifying the plurality of first participants from a plurality of primary first participants associated with the competition. Further, the processing device may be configured for generating the challenge notification for the competition between the participant and the at least one first participant based on the selection of the at least one first participant. Further, the processing device may be configured for analyzing the plurality of participant content and the plurality of first participant content based on at least one artificial intelligence model. Further, the processing device may be configured for selecting the at least one participant content from the plurality of participant content and the at least one first participant content from the plurality of first participant content based on the analyzing of the plurality of participant content and the plurality of first participant content. Further, the processing device may be configured for analyzing the score for each of the participant and the at least one first participant. Further, the processing device may be configured for determining a winner of the competition from the participant and the at least one first participant based on the analyzing of the score. Further, the processing device may be configured for generating a reward for the winner based on the determining. Further, the storage device may be communicatively coupled with the processing device. Further, the storage device may be configured for storing the reward.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

FIG. 13 illustrates a flow diagram of the scoring system for the fans for facilitating the conducting of the competition between the participants, in accordance with some embodiments.

DETAIL DESCRIPTIONS OF THE INVENTION

Figure 1:
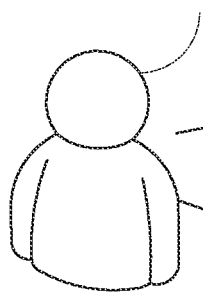
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating conducting a competition between participants, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smart phone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice based interface, gesture based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third party database, a public database, a private database, and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role based access control, and so on.

Further, one or more steps of the method disclosed herein may be initiated, maintained, controlled, and/or terminated based on a control input received from one or more devices operated by one or more users such as, for example, but not limited to, an end user, an admin, a service provider, a service consumer, an agent, a broker and a representative thereof. Further, the user as defined herein may refer to a human, an animal, or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human readable secret data (e.g. username, password, passphrase, PIN, secret question, secret answer, etc.) and/or possession of a machine readable secret data (e.g. encryption key, decryption key, bar codes, etc.) and/or possession of one or more embodied characteristics unique to the user (e.g. biometric variables such as but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human readable data from an input device such as, for example, a keyboard, a keypad, a touch-screen, a microphone, a camera, and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more, and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview

The present disclosure describes methods, systems, apparatuses, and devices for facilitating conducting a competition between participants. Further, the present disclosure describes a system that is designed for online competitions in various genres including music, dance, and comedy in video or audio format. The present disclosure also provides a digital awards system that can reward users by mailing the awards directly to the winning users or employing a crypto cash wallet system that allows users to cash out their earnings through the user computing device.

Further, the present disclosure describes an online competition system that comprises a plurality of processors and a plurality of memories, with the latter containing instructions that, when executed by a processor, trigger a competition step, a challenge step, a voting step, a digital award step, and a profile step. The instructions may include routines, programs, objects, data structures, and the like. The information system can be implemented in a network environment that may comprise one or more servers. The competition step may include a user-registration process and an option-selection process configured to provide various options for a competition. The user-registration process may be configured to allow users to input their user information (e.g., personal information), or by a much more streamlined approach such as allowing the user to select to join such a competition via audience slot or contestant (competitor slot), which can be stored in a storage device that may be communicatively connected to the online competition system.

In one embodiment, the option-selection process may also include an admin panel that displays the options for users to select. These options may include but are not limited to the number of rounds, region or location, prizes, or main event, and they can be turned on or off.

In some embodiments, the competition step may also include a content filter that can use artificial intelligence (AI) to filter out specific content in audio or video formatting that can be provided by the user for the competition.

The competition step may also include choosing an option for any auto-start conditions for competition; team-based collaborative competition; and settings that determine the number of viewers or performers for each competition, define competitions as donation-based, allow for selecting beats to be used in the competition, provide a built-in voting system (where the beat with the most votes will be selected for competition), and allow for a built-in monetization process for ad placement before or between rounds. In addition, the option-selection process may provide an option to select mini-games for tiebreakers. An ability to set round intro Video or Image pre-sets & allow the option for viewers to view the competition using AI powered Filters. The competition step may also include the option to create an invite only competition, a special panel judge mode as well as a elimination mode. The competition step may also allow users to vote on a beat & contestants to select a spot(s) on a particular track of the beat.

Further, the challenge step may include a user-selection process that allows users in different musical genres to challenge other users whose user information may be stored in the online competition system of the present invention through the registration process. The challenge step may be configured to allow users to upload their creations in the form of various types of information or content, including but not limited to video files, animation files, audio files, and other media files.

The user-selection process can be configured in a way that allows users to send challenge-related information such as one or more of their challenge partners and their video (which can be about 30-60 seconds in length) to the storage device and/or the challenge partners. In some embodiments, the user-selection process may allow users to place a wager. The user-selection process may send a notification to the challenge partners after receiving the challenge information. The user-selection process may also post a challenge notification on a general display that may be included in the online competition system of the present invention. For example, a display of the online competition system may include a main lobby, and the challenge can be displayed as a "reserved" competition lasting for a predetermined period (e.g., for 24 hours). Users will also have the ability to decide on if they would like to turn on an audio option & can adjust the round length for that challenge.

Further, the voting step may include a simple process and an advanced process. The simple and advanced processes can include a scoring system for determination of the winner of the competition.

The simple process may be a "star" point-based system where the number of stars can represent a specified number of points. For example, one star can be 10 or more points, and two stars can be 100 or more points.

The advanced process can be based on rating categories and related points. For example, the advanced process can include various categories such as rap, dance, singing, DJ, instrumentals, all having predetermined points (e.g., on a scale of 1 to 10).

In one embodiment, the simple and advanced processes can be configured such that the user may begin the competition with X amount of points; in this case, a user who runs out of points can be eliminated from the competition.

In another embodiment, the voting step may include an AI to automate the simple and advanced processes.

The scoring system for the simple and advanced processes may include a plurality of rounds, an overall round score for each participant, an overall final score for each participant, and an overall contest score, along with competition placement for each participant where the participant may be considered a user participating the competition as an artist or a fan.

The scoring system can be configured to calculate the overall round score, overall final score, and overall contest score as well as determine the competition placement for the fan or the artist.

The overall round score can be calculated by adding all the round scores for the artists or round scores placed by the fans and dividing the sum total of the scores by the number of artists or fans. The overall final score can be calculated by adding scores from each round and dividing the sum total of the scores by the number of fans. The overall contest score can be calculated by adding all scores from the fans and dividing the sum total of the scores by the number of fans. The competition placement for the fan or the artist can be determined by sorting the overall final scores. If overall final scores are identical (a tie), the prizes can be added and divided by the number of users with identical overall final scores to determine the prize for each user.

Further, the digital award step may include category information and an award process. The category information can include one or more genres and general field information that can be used in the award process, which can be configured to determine a REMIX winner following predetermined rules.

In one embodiment, the award process can include the following steps: Rules are reviewed; entries (the creations uploaded by the users) are submitted across multiple categories (which can be about 85 categories); users organize entries into appropriate fields; users participate in a nominating process that determines finalists (which may be about five) in each category, and users participate in a final voting process that determines the Remix winners.

The profile step may include a talent data management system that may be configured to show various data related to talent management. For example, the talent management system may use online connection information to show audience growth in a set time frame with respect to various factors including competitions won, challenges won, or unique plays (e.g., brands), viewer engagement, and scores.

In some embodiments, the profile step may include a leaderboard genre-specific ranking process that compares the genre-specific win/loss ratio score of each user to provide genre-specific ranking information, a profile card win ratio process that provides the win ratio of a particular user, and a profile card overall ranking process that compares the win/loss ratio scores of the users.

In some embodiments, the online competition system may include a payment system to reward winning users. The payment system can be configured to send the rewards directly to the winning users or may use a crypto cash reward system to reward them.

The steps and the processes described in connection with the embodiments disclosed herein can be embodied directly in hardware, in a software module executed by a processor, or in a combination of the two. A software module can reside in a memory unit that can include volatile memory, non-volatile memory, and network devices, or other data storage devices now known or later developed for storing information/data. The volatile memory may be any type of volatile memory including, but not limited to, static or dynamic, random access memory (SRAM or DRAM). The non-volatile memory may be any non-volatile memory including, but not limited to, ROM, EPROM, EEPROM, flash memory, and magnetically or optically readable memory or memory devices such as compact discs (CDs) or digital video discs (DVDs), magnetic tape, and hard drives.

The computing device may be a laptop computer, a cellular phone, a personal digital assistant (PDA), a tablet computer, and other mobile devices of the type. Communications between components and/or devices in the systems and methods disclosed herein may be unidirectional or bidirectional electronic communication through a wired or wireless configuration or network. For example, one component or device may be wired or networked wirelessly directly or indirectly, through a third-party intermediary, over the Internet, or otherwise with another component or device to enable communication between the components or devices. Examples of wireless communications include, but are not limited to, radio frequency (RF), infrared, Bluetooth, wireless local area network (WLAN) (such as WiFi), or wireless network radio, such as a radio capable of communicating with a wireless communication network such as a Long Term Evolution (LTE) network, WiMAX network, 3G network, 4G network, and other communication networks of the type. In example embodiments, a network can be configured to provide and employ 5G wireless networking features and functionalities.

Further, the present disclosure describes a system that is intended to address problems associated with and/or otherwise improve on conventional systems and devices through an innovative online music system that is designed to provide enhanced feedback as well as convenient and increased public involvement while incorporating other problem-solving features.

Further, the present disclosure generally relates to an online application. More specifically, the present disclosure relates to software for online music creation and competition.

Further, the present disclosure describes a Black diamond level system. Further, MC Black Diamonds may be earned by participating on the platform & can be given by the audience in-streams via me remix virtual gifts. Black diamonds are used to level up & may be cashed out once a minimum threshold of 75 k black diamonds has been reached. There is two cash out options. Cash USD or Convert the diamonds into remix points.

Further, the present disclosure describes dripfilters pipelines documentation. Further, the present disclosure describes the components of the cloud MC drip filter pipeline and the trained model architectures. The pipeline provides an initial deployment strategy that aims to validate the project requirements in a cloud environment and integrates with MC's front-end webpage and mobile phone app. The user should be able to run MC's drip filter pipeline with phone gallery images, pre-recorded videos, and live streaming. The content will be uploaded to the cloud, processed, and delivered back to the user, or distributed to other viewers. For scaling the application to a large base of users a more robust pipeline was proposed, focusing on eliminating performance bottlenecks, and allowing better integration with front-end applications. The cloud API and the inference pipeline described below were designed to process videos at 30 FPS while maintaining the required output quality. Different deep learning models were trained to focus on improving speed. These lighter models can be better suited depending on the user screen size. All the cloud API, inference pipeline, and Knowledge distillation training scripts were designed and written for the MC application However concepts of Knowledge Distillation and Super Resolution were based on recent state-of-the-art academic publications. Cloud API—Communication pipeline may include the communication pipeline establishes a connection between the front-end and back-end, therefore, the user can request a video inference from the MC Dashboard website (front-end), and it will be processed by the inference pipeline (back-end). The interface was built exclusively for MC's mobile phone and web applications. Upload: This section is a flask library route on the backend that receives information from the frontend, which is: requested video link and unique id associated with. The data is then saved in a PyMongo database to keep track of unprocessed videos and progress percentages.

Request_form: {'_id': '<Unique ID>', 'url': '<Youtube URL>'}

Database and inference: The inference pipeline is always on hold when there's no video to be processed, however, when the database receives and registers a new input, the inference pipeline catches the given video link and starts to process it, keeping the database up to date with the progress until its job is done. Some of the data stored in the database are ID, URL, processing status, and progress.

```
request_base = {'_id': None,
'url': None,
'video': None,
'status': None,
'progress': 0.0,
'generated_url': None,
'output_file': None}
```

Progress: Finally, this section is another flask route, responsible for sending back to the front-end a current progress percentage from the video being processed. It does that by receiving a unique ID from the MC Dashboard website, looking through the database to find a matching data structure that contains the same identification, and returning its latest progress. The inference pipeline is responsible to cartoonize a given video in resemblance to MCs custom art style. It receives as input a video file and outputs its cartoonized version. This deep learning deployment pipeline and its functionalities were developed specifically for MC's custom requirements. Loading the model: Before the pipeline starts to run, the model graph is read from the memory, and its placeholders are set for the execution. Shared lists: Since the pipeline is divided into multiple processes, the communication between processes/threads is handled by Shared Lists that allocate a shared memory buffer. Since there are three different processes, two shared lists are necessary. Thread 1—Video Reader This thread decodes the video frames and does the data preprocessing. Decoder: Responsible for decoding the video frame by frame using PyAV library, allowing to read and process videos in many different formats (e.g. vp9, avc1), therefore, 4 k codecs are supported. Resize: Resize the frame read from the decoder if needed (e.g. model input: 1920×1080, frame: 3840×2160, frame resized: 1920×1080). Shared list: The frame to be inferred is appended to the shared list. Thread 2—Inference: Run the machine learning model on the video frames and communicates with the database to provide real-time status to the user. Shared list: The frame to be inferred is popped from the shared list. Update database: PyMongo videos database is updated, this happens so the frontend can know how much of the video has already been processed. Inference: The frame is flattened, loaded by the network placeholders, and passed through the model architecture, which outputs a cartoonized version of the input as a contiguous array. Finally, a reshape is done to bring back its original dimensions. Convert output data type: As normal images are in 8-bit unsigned integer format, but the output data type is 32-bit float, it's necessary to make a type conversion before continuing (e.g. float32→uint8). Shared list: The frame to be post-processed is appended to the shared list. Thread 3—Post-process: Applies filters, color corrections, image transformations, and encodes the video frames to an output cartoonized video. Shared list: The frame to be post-processed is popped from the shared list. Color transfer: This method receives as parameters a source and target images. The objective is to transfer the colors from source to target, in this case, the objective is to bring back the original colors from the frame, instead of keeping the heated aspect from the cartoonizer. This effect is implemented with TensorFlow and uses GPU to process the data, but is deactivated for now. Smoother: The smoother comes to remove surface noise and maintain edges sharp from the model output. The filter makes use of the Bilateral filter technique and is implemented with CUDA and plain C, but has a Python wrapper to allow the importing on the pipeline. Halftone: The halftone effect consists of recreating the input image only with a certain pattern (e.g. dots, squares). This technique was often used by the newspaper industry when printing the images. This returns a black and white canvas that is overlayed on top of the original image, creating an effect of a comic book from the '50s. The method was implemented using OpenCV library and TensorFlow Framework to make use of the available GPU. This effect is optional. Encoder: Finally the frame is encoded and written to disk using NVIDIA Video Processing Framework, which allows encoding the video frame using GPU dedicated hardware acceleration. Audio Synchronization: Once the pipeline finishes inferring, the original clip audio track is extracted and synchronized back to the cartoonized video using the FFMPEG library.

Processing user's input data may include YouTube videos: The Request form described in the Cloud API section can be filled with a YouTube URL. The video will be downloaded, decoded, passed through the inference pipeline, and synchronized with the audio track. A path to the cartoonized video is then available to the user. Mobile Phone Live Streaming: If an RTSP URL is provided in the request form the pipeline can consume the streamed data, process it, and publish the cartoonized video to an output RTMP stream. For better support to live streaming the Cloud API and the Inference Pipeline should be integrated into services such as AWS Kinesis Video Streaming or WOWZA. Mobile Phone Gallery Photos: The user can also request to process photos. Once the request form is filled with the photo path the photo data is uploaded to the cloud and the processing is done following the same inference pipeline Knowledge distillation model. The goal of this pipeline is to take a full pre-trained model (Professor), shrink its architecture, and train a new model with the compact design (Student), guiding the output to be as similar as possible to results from the Professor. With the shrunk architecture, the amount of computations necessary to process any input data is reduced, thus, decreasing the time taken in the whole process. Teacher class: This class will act normally as the inferrer, thus, it will receive an image, pass it through the model architecture, and output a cartoonized version of the input. Loading the model: Before the pipeline starts to run properly, the model graph is read from the memory, loaded into the teacher class and its placeholders are set for execution. Creating batches: Since the original model has already been trained and the objective is to adapt its weights on a smaller network without changing the output, the dataset used for this is composed only of real images, not needing cartoonized ones. That being said, three kinds of image batches can pass through the network per iteration: real landscapes scenes, real faces, real night scenes. Respectively, the first kind is chosen every 4/5 iterations, the last two are chosen every 1/5 iterations with each having a 50% chance of being selected. Model: The training has two main parts. The first is related to the professor class, which receives an input, passes through the trained full model, and returns an output. The second is related to the student, which is the compact model that will be tuned. This last part will try to optimize the weights from the compact network so it can match the output with the cartoonization made by the professor, this is done by minimizing the loss of the difference between both outputs and updating the weights with it.

Further, knowledge distillation with super-resolution may include a pipeline that follows the same processes as the default knowledge distillation one, with the key difference being on the input size of the student part and an extra layer in the architecture. Model: The training has two parts that in the end intersect, the first is related to the professor class, that receives an input, passes through the trained full model, and returns an output, and the second is related to the student, which is the compact model itself to be tuned. This last part has an architecture with reduced input size and output with the same size as the professor's, this is possible with an extra upsample layer at the end of the process. The student model will try to change the weights from the compact network so it can match the output with the cartoonization made by the professor, this is done by minimizing the loss of the difference between both outputs and updating the weights with it.

Further, the pipeline has the objective to cartoonize a given video and apply optional post-process effects to it. This whole system design is managed by clear communication between the front-end and back-end, where the first feed a video to a queue in the database and the latter retrieves the video so the processing can start. The cartoonization step is performed by a deep learning model architecture trained with the custom MC Drip FIlter artworks. To increase the efficiency of this pipeline three processes were added, being respectively responsible for asynchronously decode the input stream, infer each frame, and post-process and encode the output stream. The communication among these processes is made with global shared memory. Optional overlays and adjustments can be added before each frame is written on the disk, varying for each combination that the user chooses. During this procedure, the database is updated with the current percentage of the video processed so the front-end can inform the user about the cartoonization status. To finish, after the encoding process is done, then the output media is wrapped around a container (e.g. mp4) and made available to the user interface.

Further, the present disclosure describes MC comment highlighter. Further, users may leave a comment highlighter for a cost in USD to the user which will be pinned until the user reads the comment (comment highlighter), once the comment highlighter has been read they are then moved down to the general comments area. Comment highlighters have a 100 character limit. Once the comment highlighter has expired the comments at the top go away and the photo/video is then revealed again. Users need to swipe left to view comment highlighters.

FIG. 1 is an illustration of an online platform 100 consistent with various embodiments of the present disclosure. By way of non-limiting example, the online platform 100 to facilitate conducting a competition between participants may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, and sensors 116 over a communication network 104, such as, but not limited to, the Internet. Further, users of the online platform 100 may include relevant parties such as, but not limited to, end-users, administrators, service providers, service consumers, and so on. Accordingly, in some instances, electronic devices operated by the one or more relevant parties may be in communication with the platform.

A user 112, such as the one or more relevant parties, may access online platform 100 through a web based software application or browser. The web based software application may be embodied as, for example, but not be limited to, a website, a web application, a desktop application, and a mobile application compatible with a computing device 3800.

Figure 2:
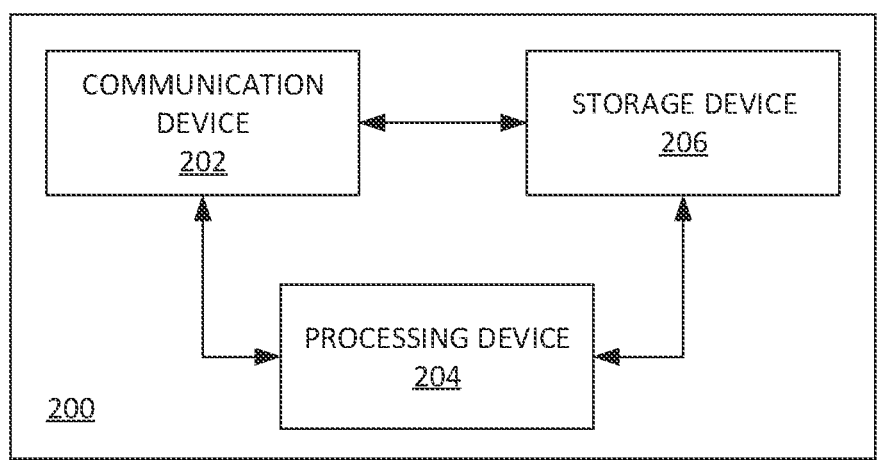
FIG. 2 is a block diagram of a system for facilitating conducting a competition between participants, in accordance with some embodiments.

FIG. 2 is a block diagram of a system 200 for facilitating conducting a competition between participants, in accordance with some embodiments. Further, the system 200 may include a communication device 202, a processing device 204, and a storage device 206.

Further, the communication device 202 may be configured for receiving a registration request from a participant device associated with a participant. Further, the communication device 202 may be configured for transmitting a participant list comprising a plurality of first participants to the participant device. Further, the communication device 202 may be configured for receiving a selection of at least one first participant of the plurality of first participants from the participant device. Further, the participant may challenge the at least one first participant to the competition. Further, the communication device 202 may be configured for transmitting a challenge notification to at least one first participant device associated with the at least one first participant. Further, the communication device 202 may be configured for receiving a plurality of participant content associated with the participant from the participant device. Further, the communication device 202 may be configured for receiving a plurality of first participant content associated with each first participant of the at least one first participant from each first participant device of the at least one first participant device. Further, the communication device 202 may be configured for transmitting at least one participant content and at least one first participant content to at least one viewer device associated with at least one viewer. Further, the communication device 202 may be configured for receiving a score for each of the participant and the at least one first participant from the at least one viewer device.

Further, the processing device 204 may be communicatively coupled with the communication device 202. Further, the processing device 204 may be configured for registering the participant to the competition based on the registration request. Further, the processing device 204 may be configured for identifying the plurality of first participants from a plurality of primary first participants associated with the competition. Further, the processing device 204 may be configured for generating the challenge notification for the competition between the participant and the at least one first participant based on the selection of the at least one first participant. Further, the processing device 204 may be configured for analyzing the plurality of participant content and the plurality of first participant content based on at least one artificial intelligence model. Further, the processing device 204 may be configured for selecting the at least one participant content from the plurality of participant content and the at least one first participant content from the plurality of first participant content based on the analyzing of the plurality of participant content and the plurality of first participant content. Further, the processing device 204 may be configured for analyzing the score for each of the participant and the at least one first participant. Further, the processing device 204 may be configured for determining a winner of the competition from the participant and the at least one first participant based on the analyzing of the score. Further, the processing device 204 may be configured for generating a reward for the winner based on the determining.

Further, the storage device 206 may be communicatively coupled with the processing device 204. Further, the storage device 206 may be configured for storing the reward.

Further, in some embodiments, the at least one viewer may include at least one of the participant and the at least one first participant. Further, the transmitting of the at least one participant content and the at least one first participant content may include transmitting the at least one participant content and the at least one first participant content to at least one of the participant device and the at least one first participant device.

Further, in an embodiment, the receiving of the score for each of the participant and the at least one first participant from the at least one viewer device may include receiving the score for each of the participant and the at least one first participant from at least one of the participant device and the at least one first participant device.

Further, in some embodiments, the communication device 202 may be configured for receiving location data associated with the participant from a location sensor. Further, the location sensor may be configured for generating the location data based on a location of the participant. Further, the processing device 204 may be configured for analyzing the location data. Further, the identifying of the plurality of first participants from the plurality of primary first participants may be based on the analyzing of the location data.

Further, in an embodiment, the processing device 204 may be configured for determining a proximity between the participant and the plurality of primary first participants. Further, the identifying of the plurality of first participants from the plurality of primary first participants may be based on the determining of the proximity.

Further, in some embodiments, the at least one viewer device may be configured for presenting the at least one participant content and the at least one first participant content to the at least one viewer. Further, the at least one viewer device may be configured for generating the score based on viewing the at least one participant content and the at least one first participant content by the at least one viewer.

Further, in an embodiment, the at least one viewer device may include at least one sensor. Further, the at least one sensor may be configured for capturing at least one implicit feedback provided by the at least one viewer based on the viewing of the at least one participant content and the at least one first participant content. Further, the generating of the score may be based on the capturing of the at least one implicit feedback. Further, in an embodiment, the at least one sensor may include a physiological sensor. Further, the physiological sensor may be configured for capturing at least one physiological response of the at least one viewer. Further, the at least one implicit feedback may include the at least one physiological response. Further, the generating of the score may be based on the capturing of the at least one physiological response. Further, in an embodiment, the at least one sensor may include a physical sensor. Further, the physical sensor may be configured for capturing at least one involuntary physical response of the at least one viewer. Further, the at least one implicit feedback may include the at least one involuntary response. Further, the generating of the score may be based on the capturing of the at least one involuntary physical response.

Further, in some embodiments, the processing device 204 may be configured for analyzing the at least one participant content and the at least one first participant content based on at least one first artificial intelligence model. Further, the processing device 204 may be configured for determining a number of points for each of the participant and the at least one first participant based on the analyzing of the at least one participant content and the at least one first participant content. Further, the determining of the winner of the competition from the participant and the at least one first participant may be based on the determining of the number of points.

Figure 3:
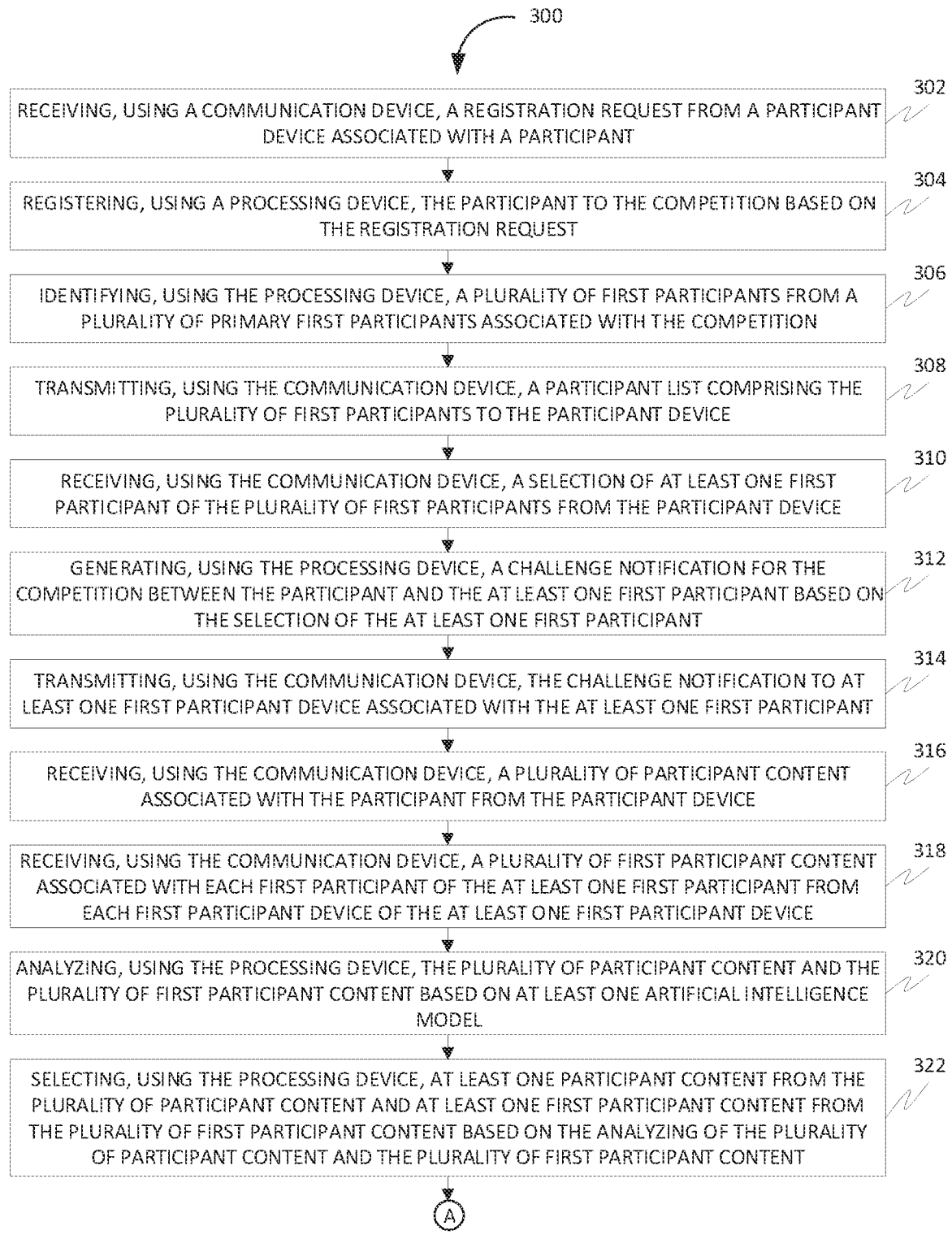
FIG. 3 is a flowchart of a method for facilitating conducting a competition between participants, in accordance with some embodiments.

FIG. 3 is a flowchart of a method 300 for facilitating conducting a competition between participants, in accordance with some embodiments. Further, at 302, the method 300 may include receiving, using a communication device, a registration request from a participant device associated with a participant. Further, the participant device may include a computing device, such as a smartphone, a tablet, a laptop, a desktop, and so on. Further, the participant may include an individual that may want to compete in the competition.

Further, at 304, the method 300 may include registering, using a processing device, the participant to the competition based on the registration request.

Further, at 306, the method 300 may include identifying, using the processing device, a plurality of first participants from a plurality of primary first participants associated with the competition. Further, the plurality of first participants may compete with the participant in the competition.

Further, at 308, the method 300 may include transmitting, using the communication device, a participant list comprising the plurality of first participants to the participant device.

Further, at 310, the method 300 may include receiving, using the communication device, a selection of at least one first participant of the plurality of first participants from the participant device. Further, the participant challenges the at least one first participant to the competition.

Further, at 312, the method 300 may include generating, using the processing device, a challenge notification for the competition between the participant and the at least one first participant based on the selection of the at least one first participant.

Further, at 314, the method 300 may include transmitting, using the communication device, the challenge notification to at least one first participant device associated with the at least one first participant. Further, the at least one first participant device may include a computing device, such as a smartphone, a tablet, a laptop, a desktop, and so on.

Further, at 316, the method 300 may include receiving, using the communication device, a plurality of participant content associated with the participant from the participant device. Further, the plurality of participant content may include a video, an audio, an audio video, etc.

Further, at 318, the method 300 may include receiving, using the communication device, a plurality of first participant content associated with each first participant of the at least one first participant from each first participant device of the at least one first participant device. Further, the plurality of first participant content may include a video, an audio, an audio video, etc.

Further, at 320, the method 300 may include analyzing, using the processing device, the plurality of participant content and the plurality of first participant content based on at least one artificial intelligence model.

Further, at 322, the method 300 may include selecting, using the processing device, at least one participant content from the plurality of participant content and at least one first participant content from the plurality of first participant content based on the analyzing of the plurality of participant content and the plurality of first participant content. Further, the plurality of participant content and the plurality of first participant content may not be up to a standard of the competition. Further, the at least one participant content from the plurality of participant content and the at least one first participant content from the plurality of first participant content may be selected based on the standard of the competition.

Further, at 324, the method 300 may include transmitting, using the communication device, the at least one participant content and the at least one first participant content to at least one viewer device associated with at least one viewer. Further, the at least one viewer device may include a computing device, such as a smartphone, a tablet, a laptop, a desktop, and so on. Further, the at least one viewer may include a individual that views the at least one participant content and the at least one first participant content.

Further, at 326, the method 300 may include receiving, using the communication device, a score for each of the participant and the at least one first participant from the at least one viewer device.

Further, at 328, the method 300 may include analyzing, using the processing device, the score for each of the participant and the at least one first participant.

Further, at 330, the method 300 may include determining, using the processing device, a winner of the competition from the participant and the at least one first participant based on the analyzing of the score.

Further, at 332, the method 300 may include generating, using the processing device, a reward for the winner based on the determining.

Further, at 334, the method 300 may include storing, using a storage device, the reward.

Further, in some embodiments, the at least one viewer may include at least one of the participant and the at least one first participant. Further, the transmitting of the at least one participant content and the at least one first participant content may include transmitting the at least one participant content and the at least one first participant content to at least one of the participant device and the at least one first participant device.

Further, in an embodiment, the receiving of the score for each of the participant and the at least one first participant from the at least one viewer device may include receiving the score for each of the participant and the at least one first participant from at least one of the participant device and the at least one first participant device.

Further, in some embodiments, the at least one viewer device may be configured for presenting the at least one participant content and the at least one first participant content to the at least one viewer. Further, the at least one viewer device may be configured for generating the score based on viewing the at least one participant content and the at least one first participant content by the at least one viewer.

Further, in an embodiment, the at least one viewer device may include at least one sensor. Further, the at least one sensor may be configured for capturing at least one implicit feedback provided by the at least one viewer based on the viewing of the at least one participant content and the at least one first participant content. Further, the at least one viewer may provide the at least one implicit feedback. Further, the at least one implicit feedback may indicate enjoyment levels of the at least one viewer in response to the viewing of the at least one participant content and the at least one first participant content. Further, the generating of the score may be based on the capturing of the at least one implicit feedback. Further, in an embodiment, the at least one sensor may include a physiological sensor. Further, the physiological sensor may be configured for capturing at least one physiological response of the at least one viewer. Further, the at least one physiological response may include a change in at least one of a heart rate, a respiration rate, a perspiration rate, and an eye pupil dilation. Further, the at least one implicit feedback may include the at least one physiological response. Further, the generating of the score may be based on the capturing of the at least one physiological response. Further, in an embodiment, the at least one sensor may include a physical sensor. Further, the physical sensor may be configured for capturing at least one involuntary physical response of the at least one viewer. Further, the at least one involuntary physical response may include swaying of head, tapping of foot, movement of body, etc. Further, the at least one implicit feedback may include the at least one involuntary response. Further, the generating of the score may be based on the capturing of the at least one involuntary physical response.

Figure 4:
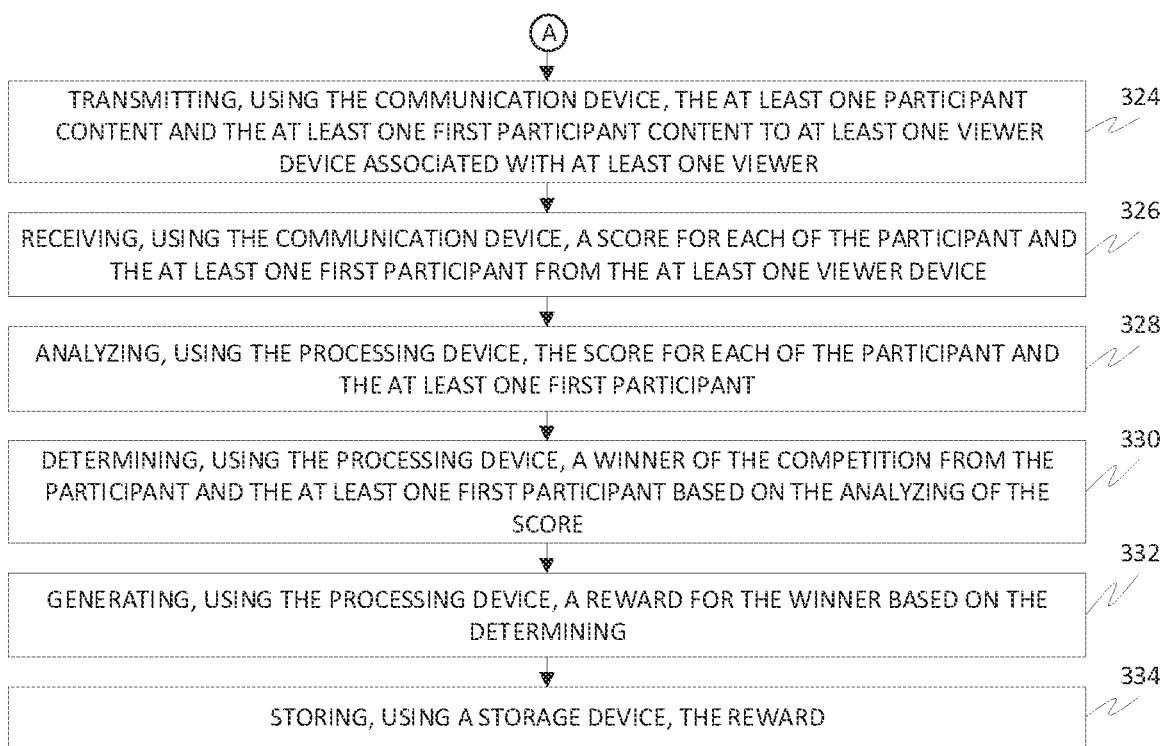
FIG. 4 is a continuation flowchart of the method, as shown in FIG. 3, in accordance with some embodiments.

FIG. 4 is a continuation flowchart of the method 300, as shown in FIG. 3, in accordance with some embodiments.

Figure 5:
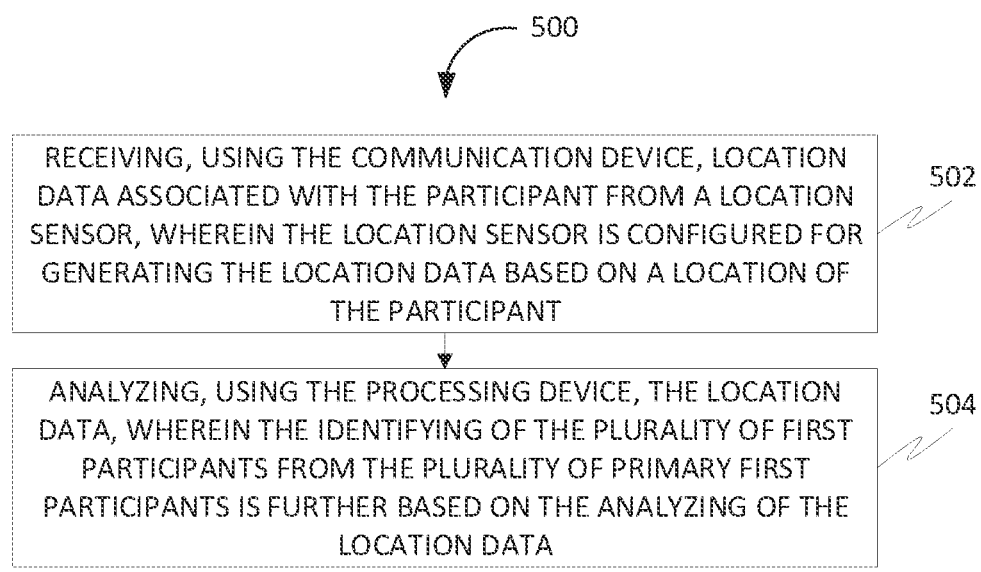
FIG. 5 is a flowchart of a method for identifying the plurality of first participants for facilitating the conducting of the competition between the participants, in accordance with some embodiments.

FIG. 5 is a flowchart of a method 500 for identifying the plurality of first participants for facilitating the conducting of the competition between the participants, in accordance with some embodiments. Further, at 502, the method 500 may include receiving, using the communication device, location data associated with the participant from a location sensor. Further, the location sensor may be configured for generating the location data based on a location of the participant.

Further, at 504, the method 500 may include analyzing, using the processing device, the location data. Further, the identifying of the plurality of first participants from the plurality of primary first participants may be based on the analyzing of the location data. Further, the identifying of the plurality of first participants based on the location of the participant limits the competition to a particular location for promoting equality among the participant and the plurality of first participants competing in the competition.

Further, in an embodiment, the method 500 may include determining, using the processing device, a proximity between the participant and the plurality of primary first participants. Further, the identifying of the plurality of first participants from the plurality of primary first participants may be based on the determining of the proximity.

Figure 6:
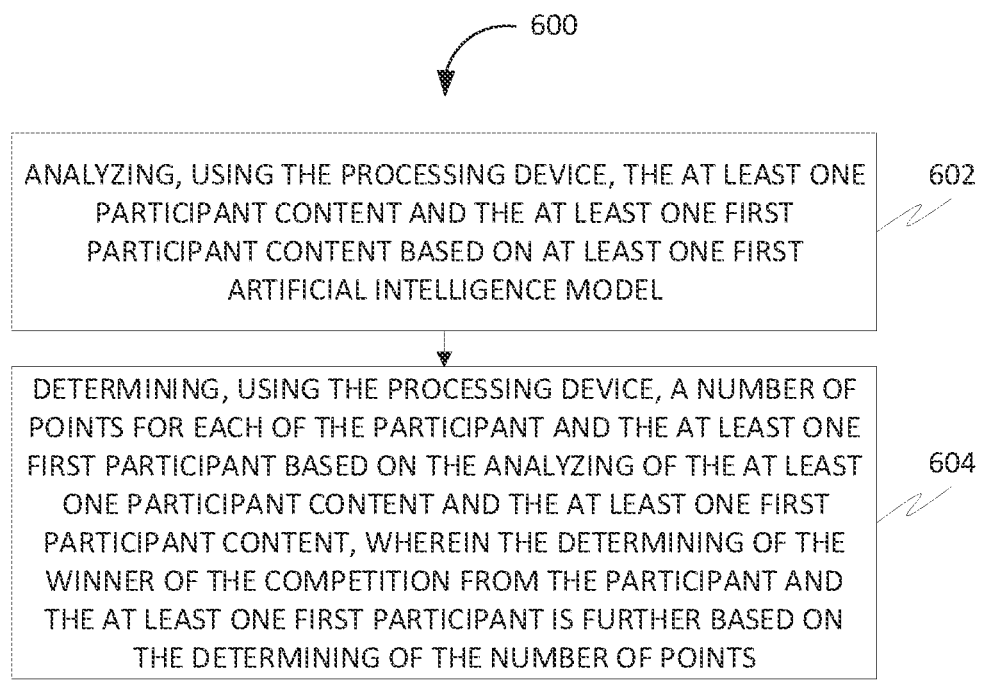
FIG. 6 is a flowchart of a method for determining the winner of the competition for facilitating the conducting of the competition between the participants, in accordance with some embodiments.

FIG. 6 is a flowchart of a method 600 for determining the winner of the competition for facilitating the conducting of the competition between the participants, in accordance with some embodiments. Further, at 602, the method 600 may include analyzing, using the processing device, the at least one participant content and the at least one first participant content based on at least one first artificial intelligence model.

Further, at 604, the method 600 may include determining, using the processing device, a number of points for each of the participant and the at least one first participant based on the analyzing of the at least one participant content and the at least one first participant content. Further, the determining of the winner of the competition from the participant and the at least one first participant may be based on the determining of the number of points.

Figure 7:
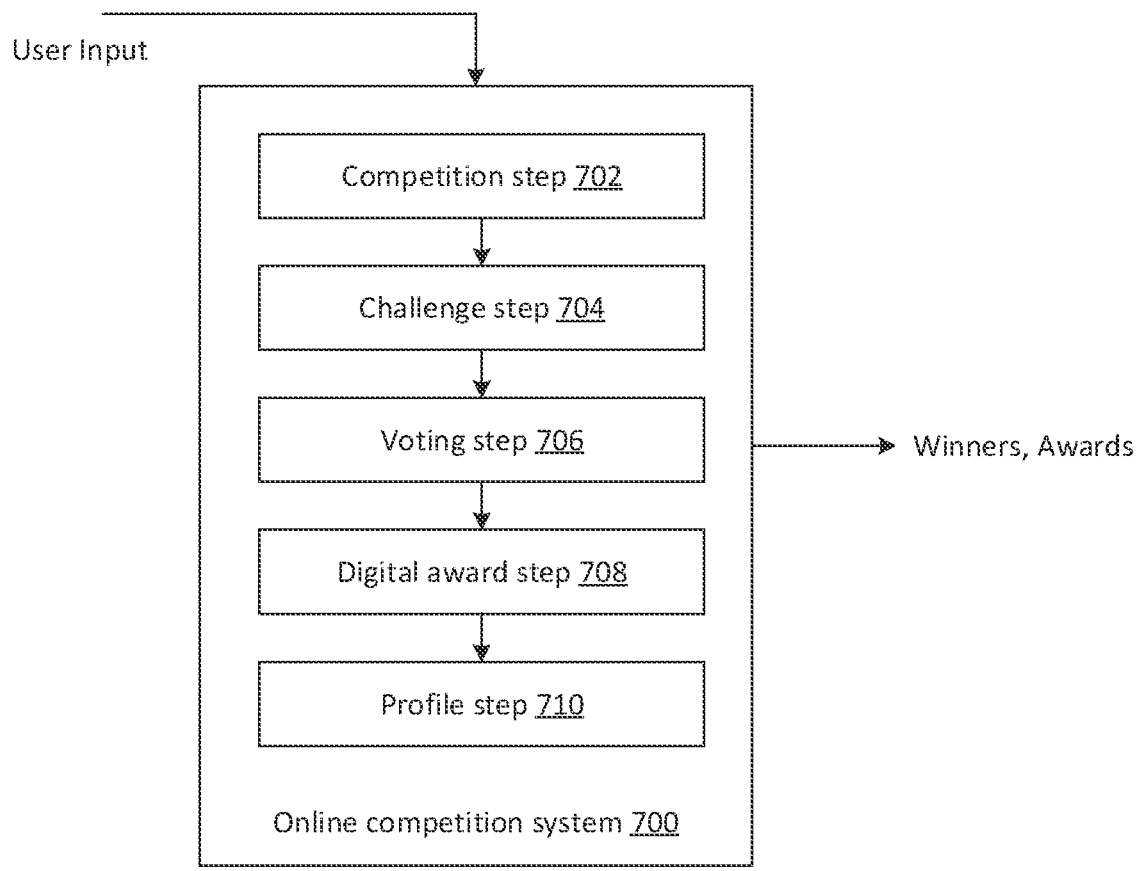
FIG. 7 is a block diagram of an online competition system for facilitating the conducting of the competition between the participants, in accordance with some embodiments.

FIG. 7 is a block diagram of an online competition system 700 for facilitating the conducting of the competition between the participants, in accordance with some embodiments. Further, the online competition system 700 may include a competition step 702, a challenge step 704, a voting step 706, a digital award step 708, and a profile step 710. Further, the online competition system 700 may receive an user input. Further, the online competition system 700 may provide winners and awards.

Figure 8:
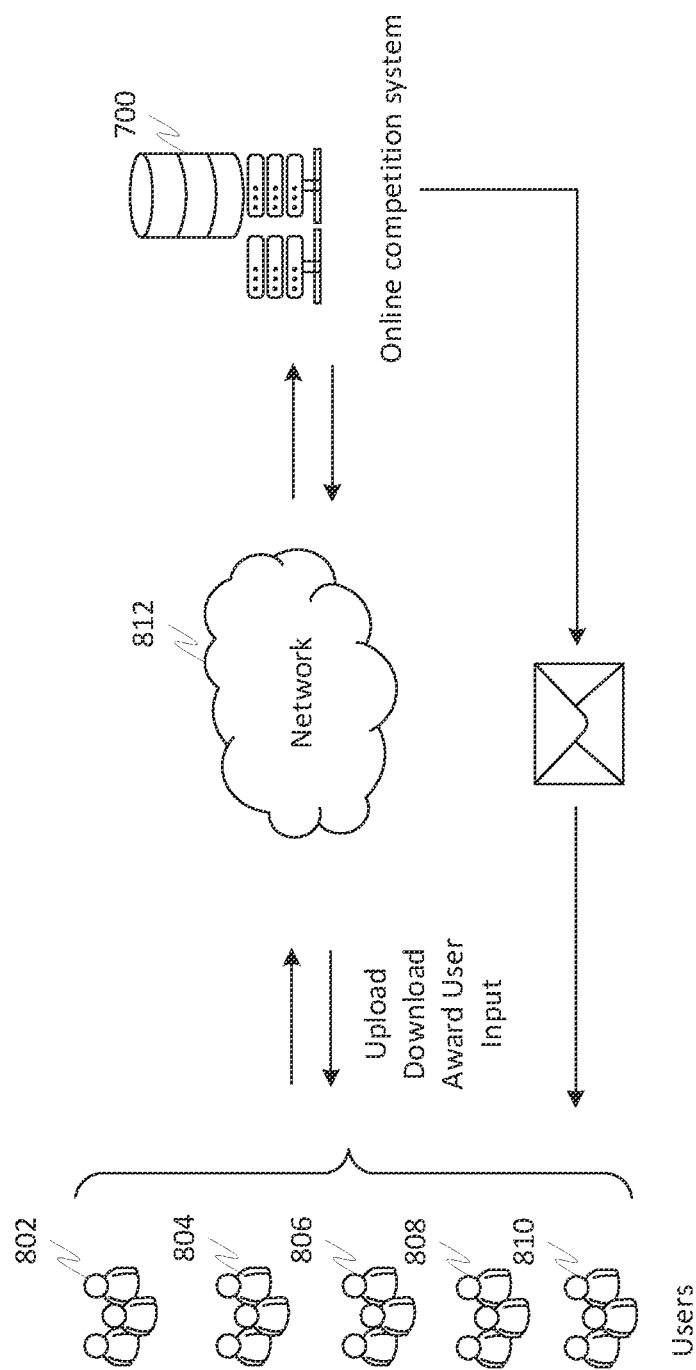
FIG. 8 illustrates a network environment for facilitating the conducting of the competition between the participants, in accordance with some embodiments.

FIG. 8 illustrates a network environment for facilitating the conducting of the competition between the participants, in accordance with some embodiments. Further, the network environment may include a plurality of users 802-810 and the online competition system 700. Further, the plurality of users 802-810 and the online competition system 700 may be communicatively coupled using a network 812.

Figure 9:
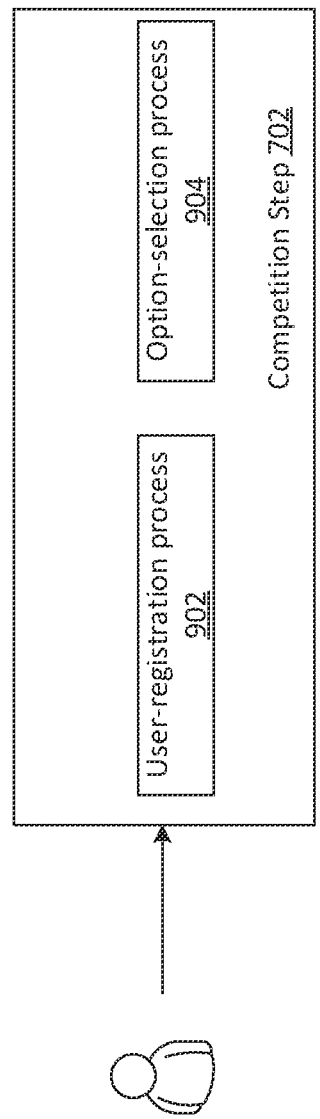
FIG. 9 is a block diagram of the competition step of the online competition system, in accordance with some embodiments.

FIG. 9 is a block diagram of the competition step 702 of the online competition system 700, in accordance with some embodiments. Further, the competition step 702 may include a user registration process 902 and an option selection process 904.

Figure 10:
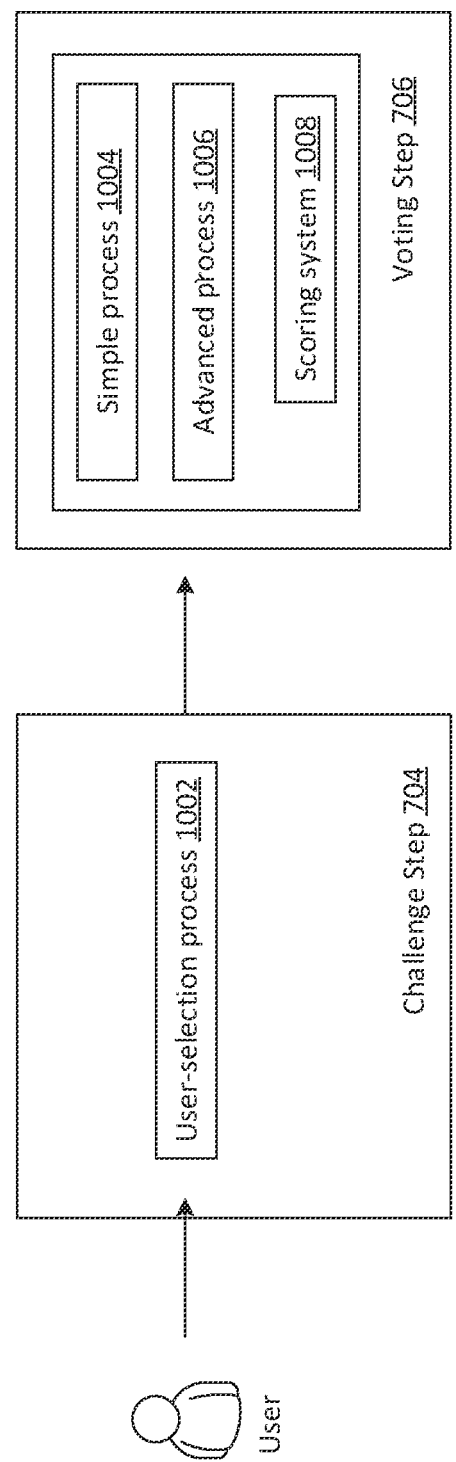
FIG. 10 is a block diagram of the challenge step and the voting step of the online competition system, in accordance with some embodiments.

FIG. 10 is a block diagram of the challenge step 704 and the voting step 706 of the online competition system 700, in accordance with some embodiments. Further, the challenge step 704 may include a user selection process 1002. Further, the voting step 706 may include a simple process 1004, an advanced process 1006, and a scoring system 1008.

Figure 11:
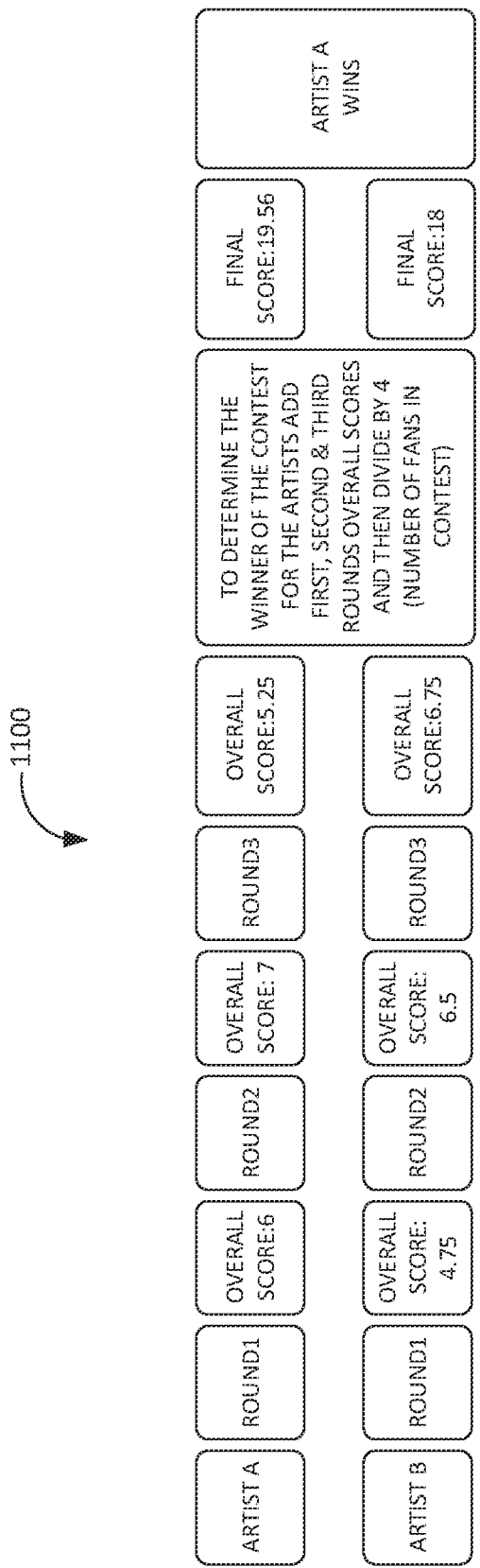
FIG. 11 illustrates a flow diagram of a scoring system for artists for facilitating the conducting of the competition between the participants, in accordance with some embodiments.

FIG. 11 illustrates a flow diagram of a scoring system 1100 for artists for facilitating the conducting of the competition between the participants, in accordance with some embodiments.

Figure 12:
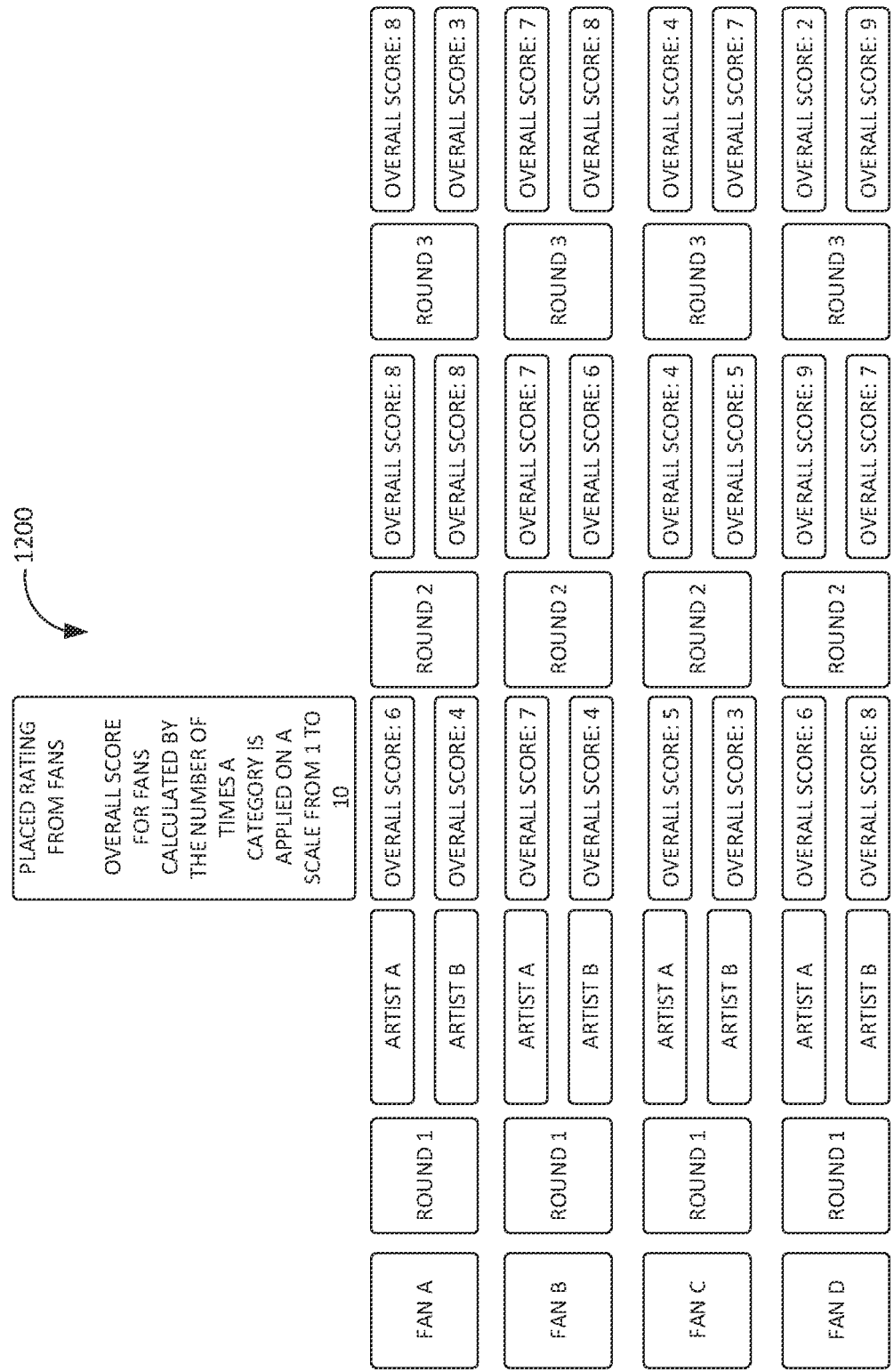
FIG. 12 illustrates a flow diagram of a scoring system for fans for facilitating the conducting of the competition between the participants, in accordance with some embodiments.

FIG. 12 illustrates a flow diagram of a scoring system 1200 for fans for facilitating the conducting of the competition between the participants, in accordance with some embodiments.

FIG. 13 illustrates a flow diagram of the scoring system 1200 for the fans for facilitating the conducting of the competition between the participants, in accordance with some embodiments.

Figure 14:
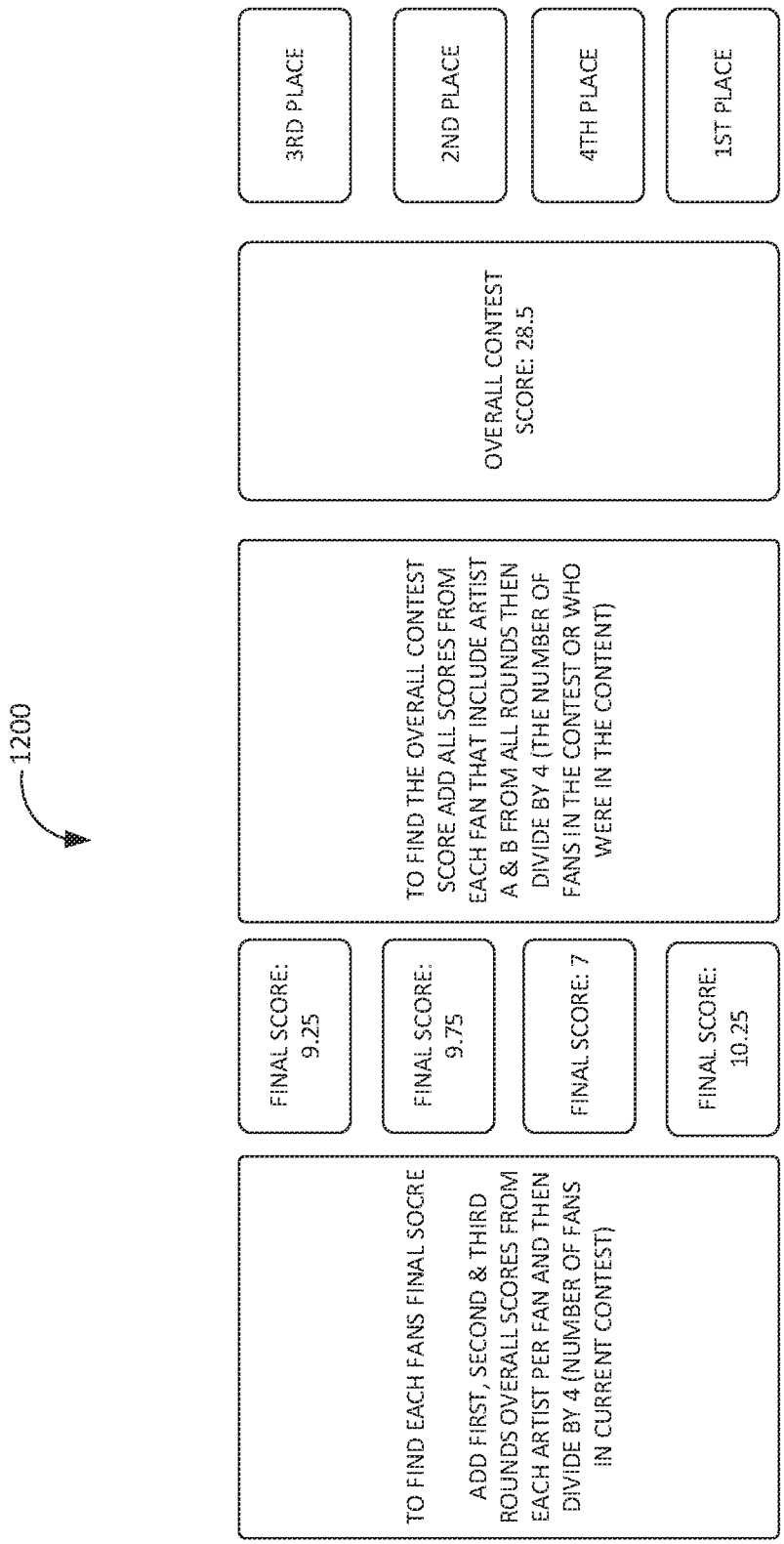
FIG. 14 illustrates a flow diagram of the scoring system for the fans for facilitating the conducting of the competition between the participants, in accordance with some embodiments.

FIG. 14 illustrates a flow diagram of the scoring system 1200 for the fans for facilitating the conducting of the competition between the participants, in accordance with some embodiments.

Figure 15:
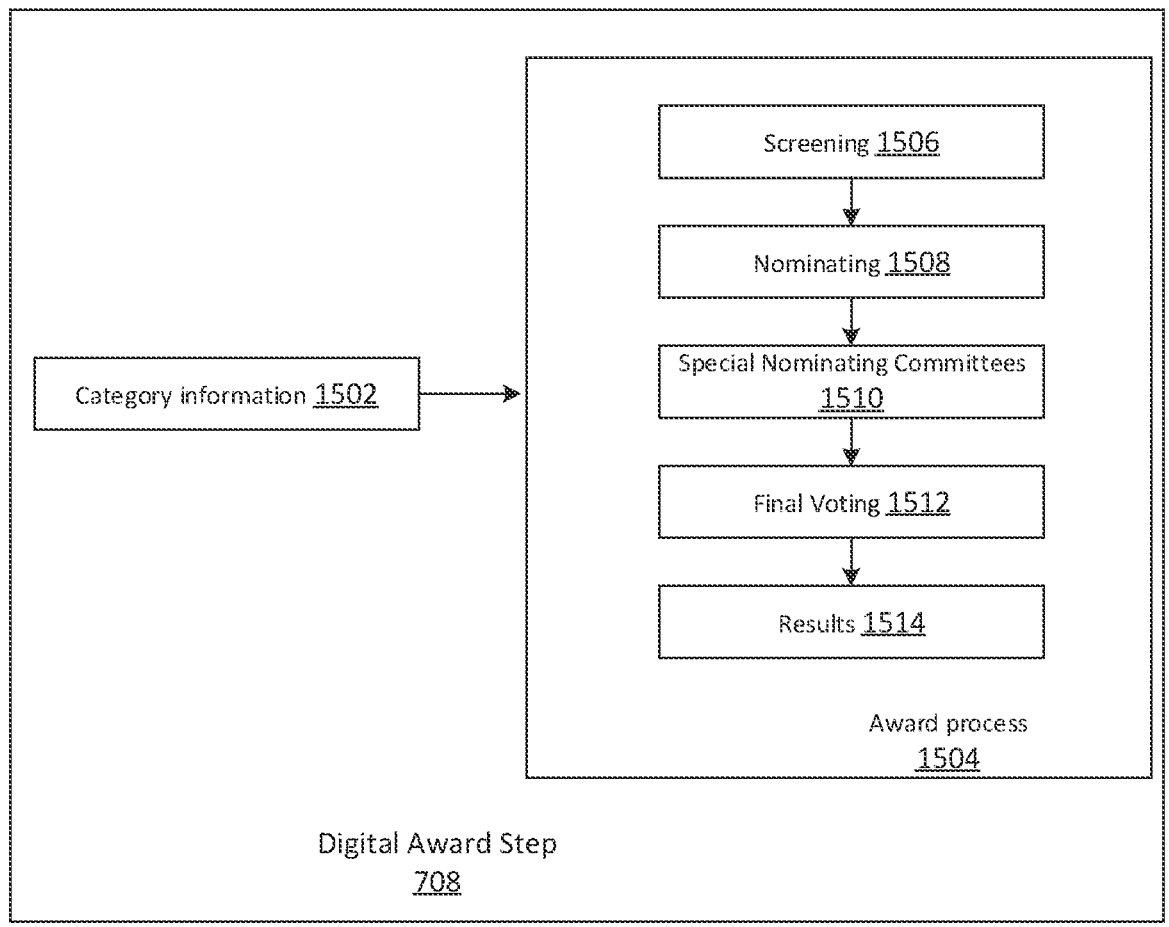
FIG. 15 is a block diagram of the digital award step of the online competition system, in accordance with some embodiments.

FIG. 15 is a block diagram of the digital award step 708 of the online competition system 700, in accordance with some embodiments. Further, the digital award step 708 may include category information 1502 and an award process 1504. Further, the award process 1504 may include a screening 1506, a nominating 1508, special nominating committees 1510, a final voting 1512, and results 1514.

Figure 16:
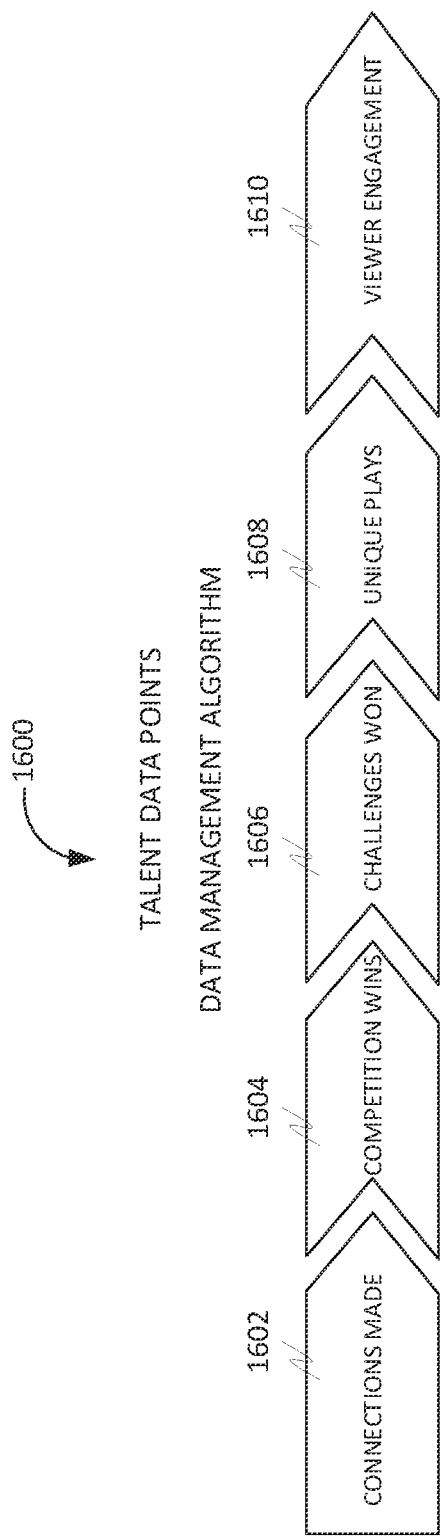
FIG. 16 illustrates a flow diagram of a data management algorithm for facilitating the conducting of the competition between the participants, in accordance with some embodiments.

FIG. 16 illustrates a flow diagram of a data management algorithm 1600 for facilitating the conducting of the competition between the participants, in accordance with some embodiments. Further, at 1602, the data management algorithm 1600 may include a step of connection made. Further, the connection made may be an amount of audience growth talent has made in a set time frame. This can show if talent is growing in popularity based competitions won, challenges won or unique plays generated from their profile music tracks which are pulled from either Soundcloud™ or Spotify™. Further, at 1604, the data management algorithm 1600 may include a step of competition wins. Further, the competition wins may include a goodness of the content generates by artists vs others in context of their genre. This is correlated with the new voting system that is determined by viewers or "the people". Further, at 1606, the data management algorithm 1600 may include a step of challenges won. Further, the challenges won may refer to How well does talent retain the spot light in a competitive environment with respect to the music industry or craft. Everyday there is new undiscovered talent looking to get a piece of the spot light. Further, at 1608, the data management algorithm 1600 may include a step of unique plays. Further, the unique plays may tell brands if each unique play is a user converted to a fan (active listening) or a user who was not converted to a fan through passive listening. This can be examined further by looking at the ratio between connections made & unique plays generated. Further, at 1610, the data management algorithm 1600 may include a step of viewer engagement. Further, the viewer engagement may tell a person if the artist or performers viewer engagement is organic by analyzing connections made, competitions won & possible as a 3rd option unique plays.

Figure 17:
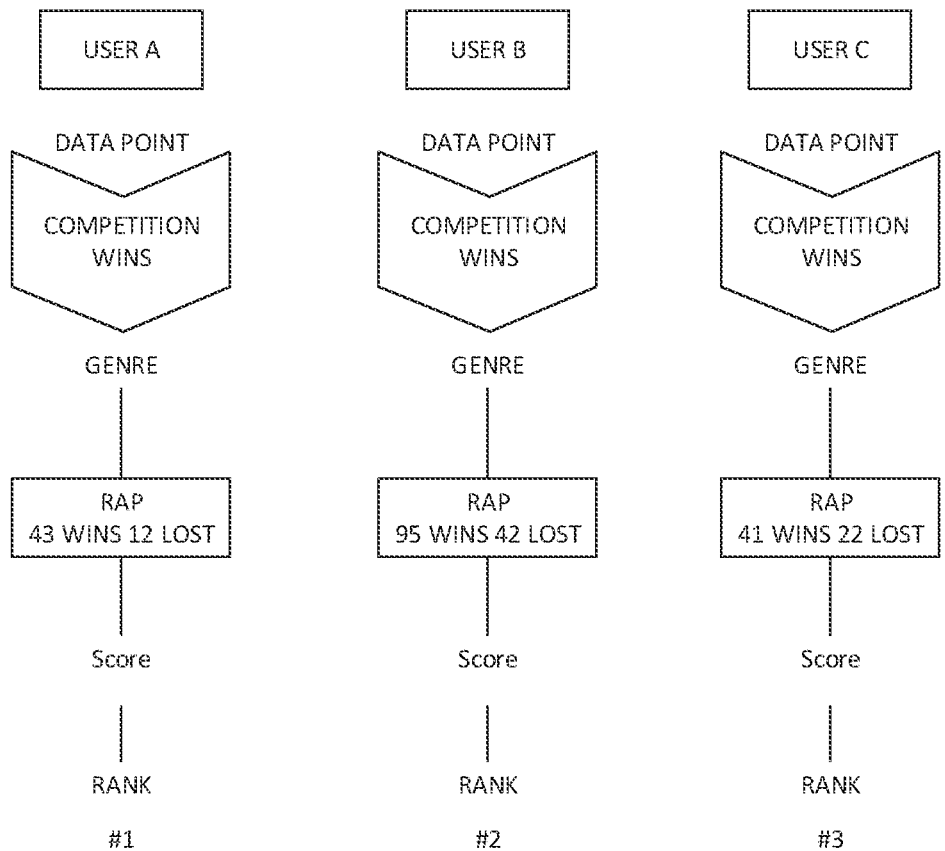
FIG. 17 illustrates a leaderboard genre specific ranking algorithm, in accordance with some embodiments.

FIG. 17 illustrates a leaderboard genre specific ranking algorithm, in accordance with some embodiments.

Figure 18:
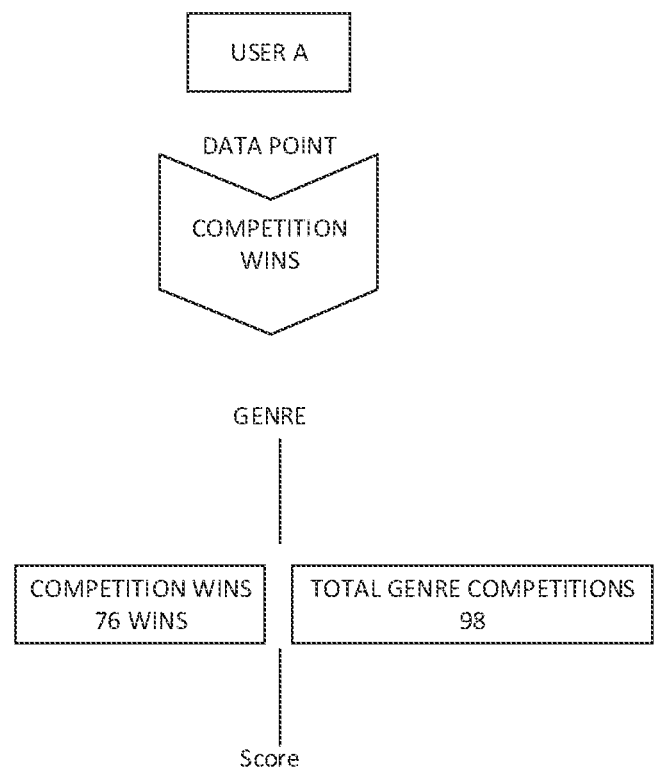
FIG. 18 illustrates a profile card win ratio algorithm, in accordance with some embodiments.

FIG. 18 illustrates a profile card win ratio algorithm, in accordance with some embodiments.

Figure 19:
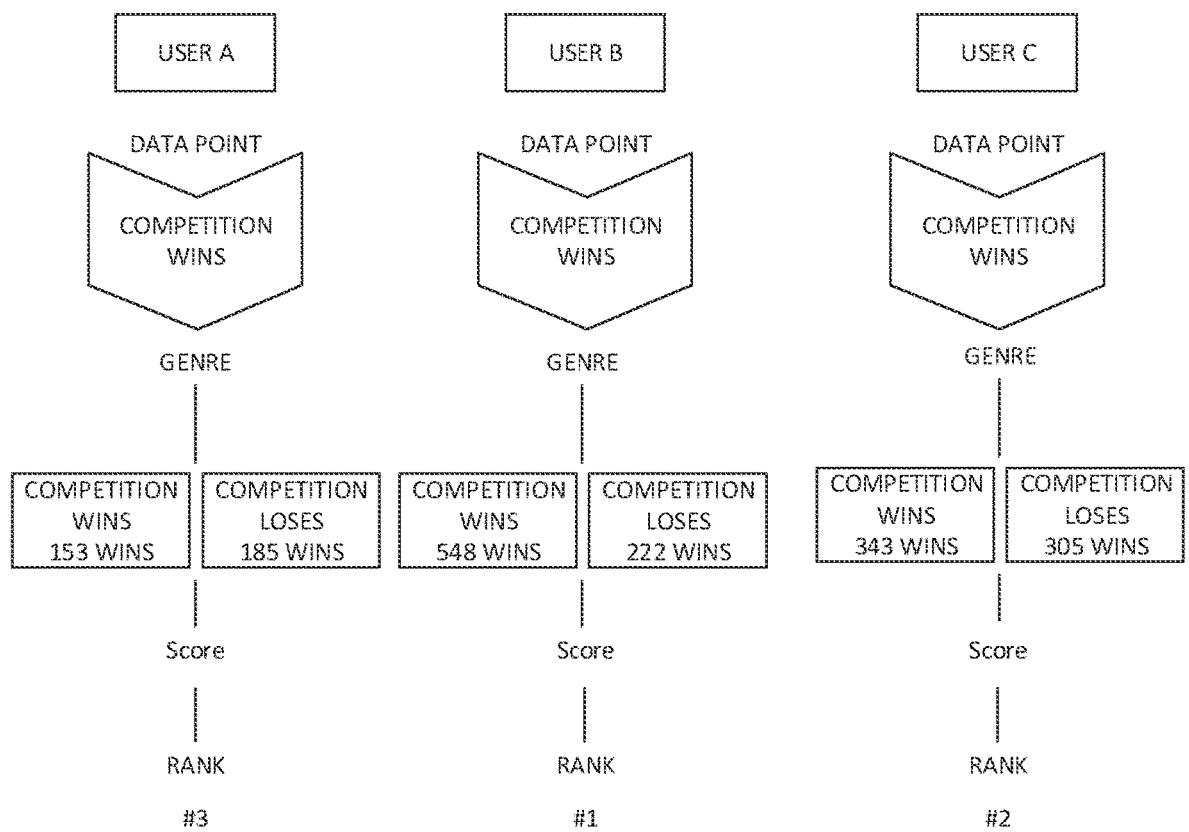
FIG. 19 illustrates a profile card overall ranking algorithm, in accordance with some embodiments.

FIG. 19 illustrates a profile card overall ranking algorithm, in accordance with some embodiments.

Figure 20:
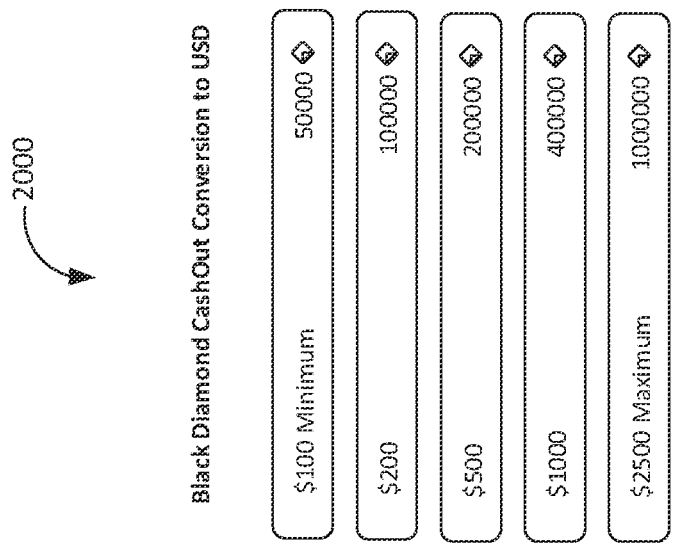
FIG. 20 illustrates a conversion table for facilitating the conversion of Black Diamonds to USD, in accordance with some embodiments.

FIG. 20 illustrates a conversion table 2000 for facilitating the conversion of Black Diamonds to USD, in accordance with some embodiments. Further, MC Black Diamonds can be earned by participating on the platform & can be given by the audience in-streams via me remix virtual gifts. Black diamonds are used to level up & can be cashed out once a minimum threshold of 50 k black diamonds has been reached. If you cash out all your Black diamonds, your level will decrease accordingly. There is two cash out options. Cash USD or Convert the diamonds into remix points.

Figure 21:
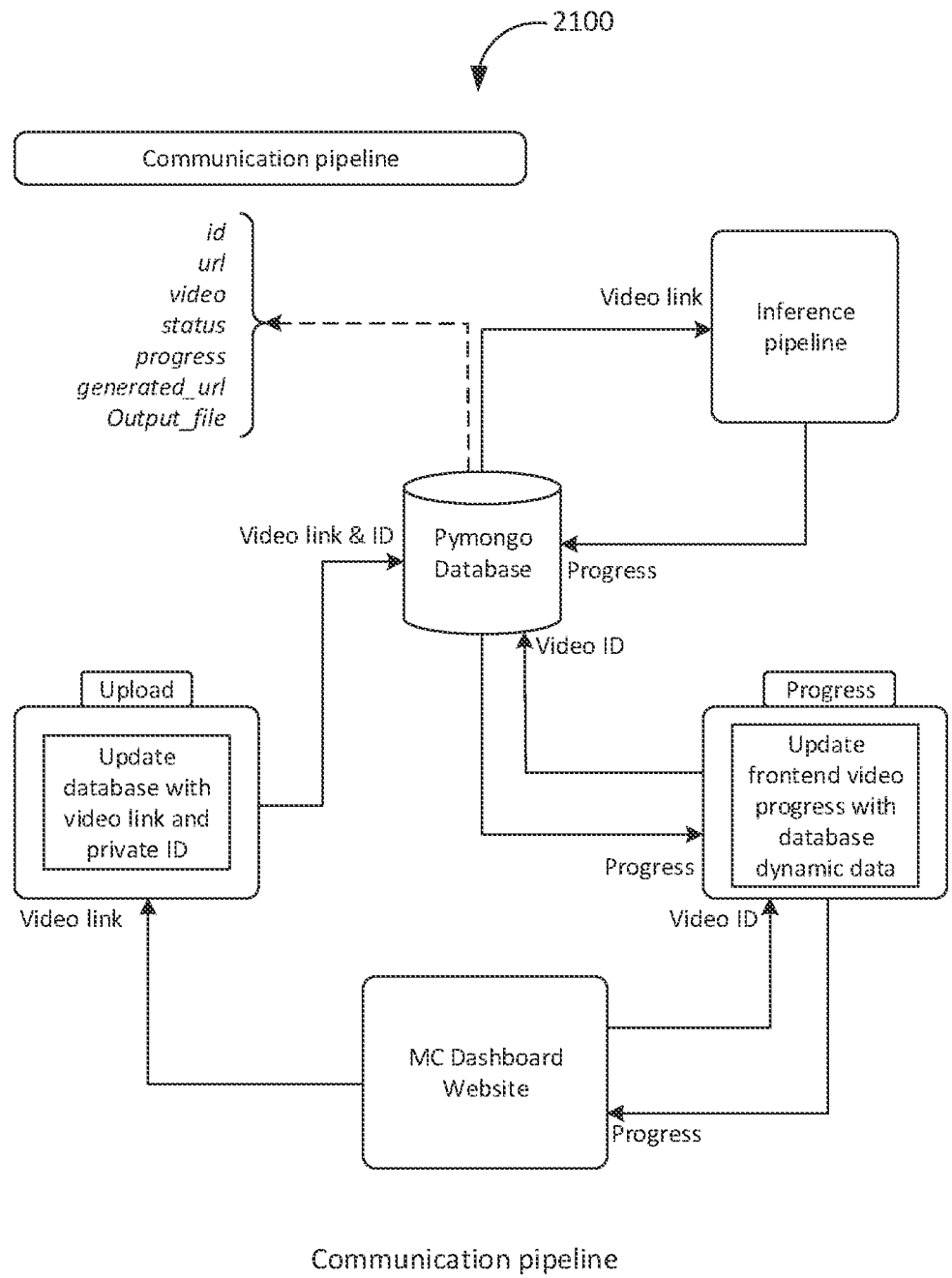
FIG. 21 illustrates a communication pipeline for facilitating the conducting of the competition between the participants, in accordance with some embodiments.

FIG. 21 illustrates a communication pipeline 2100 for facilitating the conducting of the competition between the participants, in accordance with some embodiments.

Figure 22:
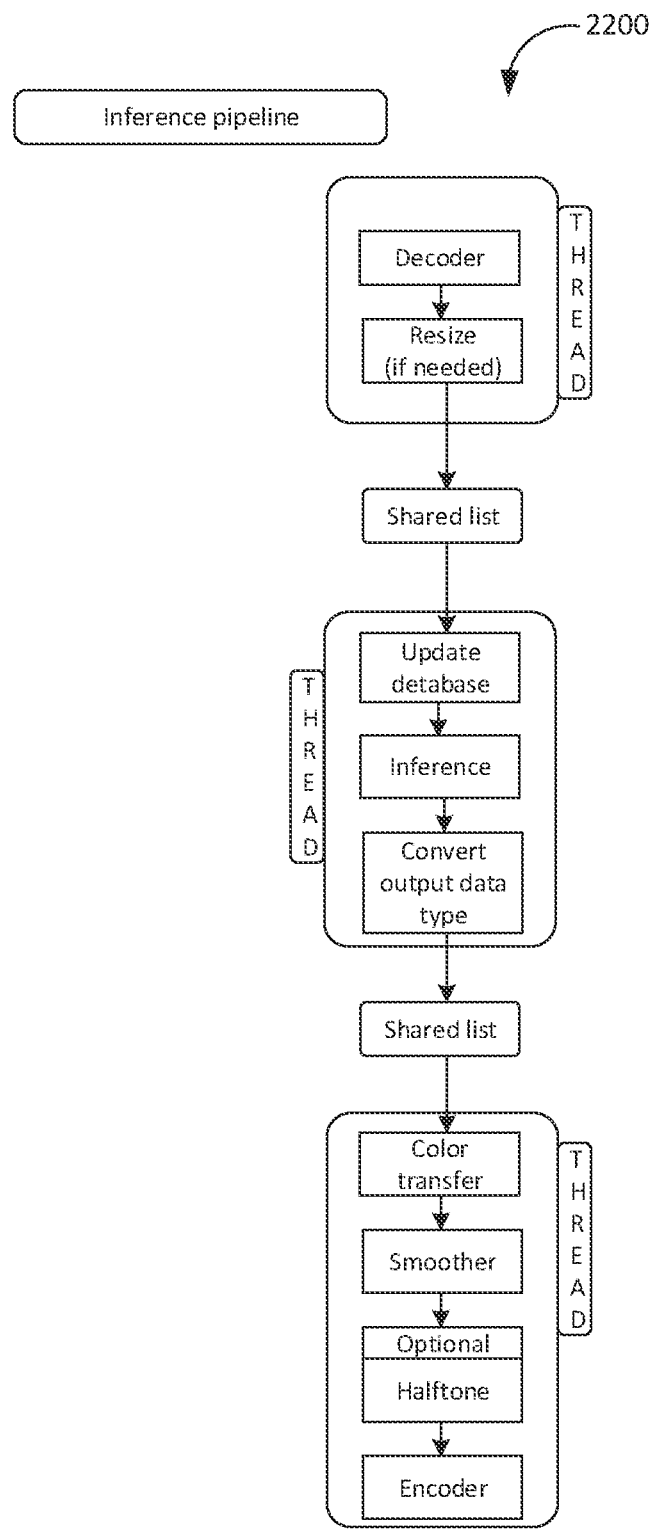
FIG. 22 illustrates an inference pipeline for facilitating the conducting of the competition between the participants, in accordance with some embodiments.

FIG. 22 illustrates an inference pipeline 2200 for facilitating the conducting of the competition between the participants, in accordance with some embodiments.

Figure 23:
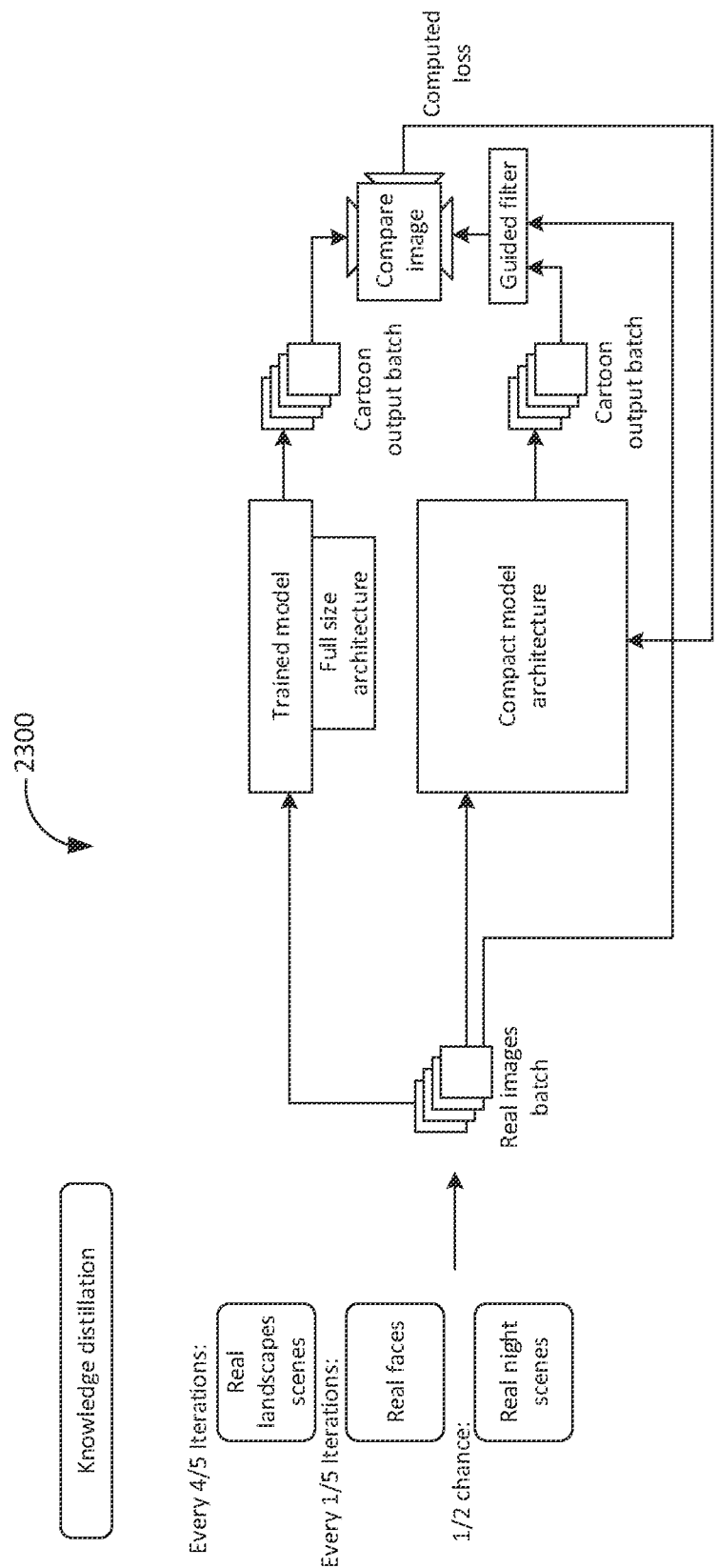
FIG. 23 illustrates a knowledge distillation pipeline for facilitating the conducting of the competition between the participants, in accordance with some embodiments.

FIG. 23 illustrates a knowledge distillation pipeline 2300 for facilitating the conducting of the competition between the participants, in accordance with some embodiments.

Figure 24:
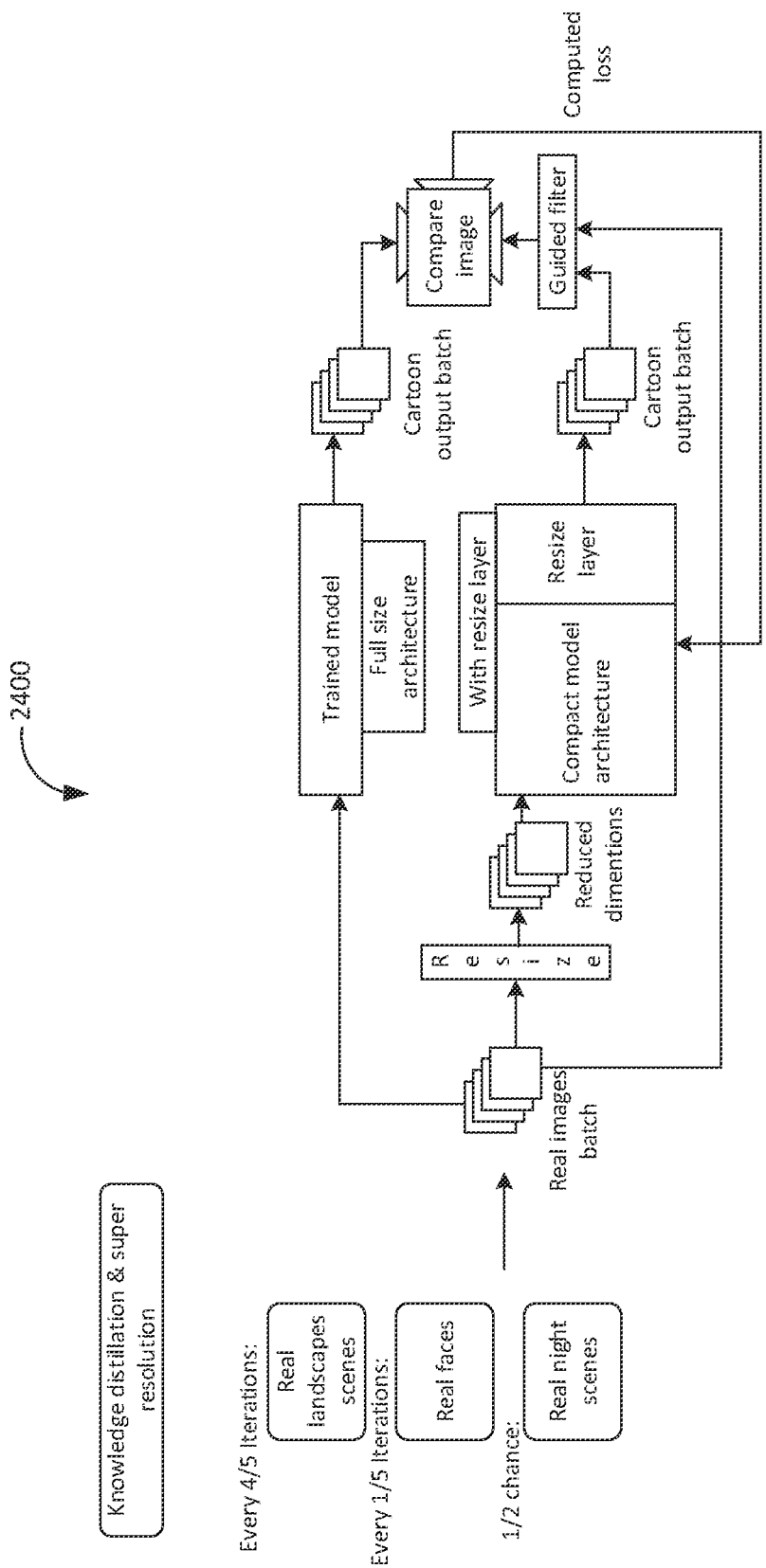
FIG. 24 illustrates a knowledge distillation and super-resolution pipeline for facilitating the conducting of the competition between the participants, in accordance with some embodiments.

FIG. 24 illustrates a knowledge distillation and super-resolution pipeline 2400 for facilitating the conducting of the competition between the participants, in accordance with some embodiments.

Figure 25:
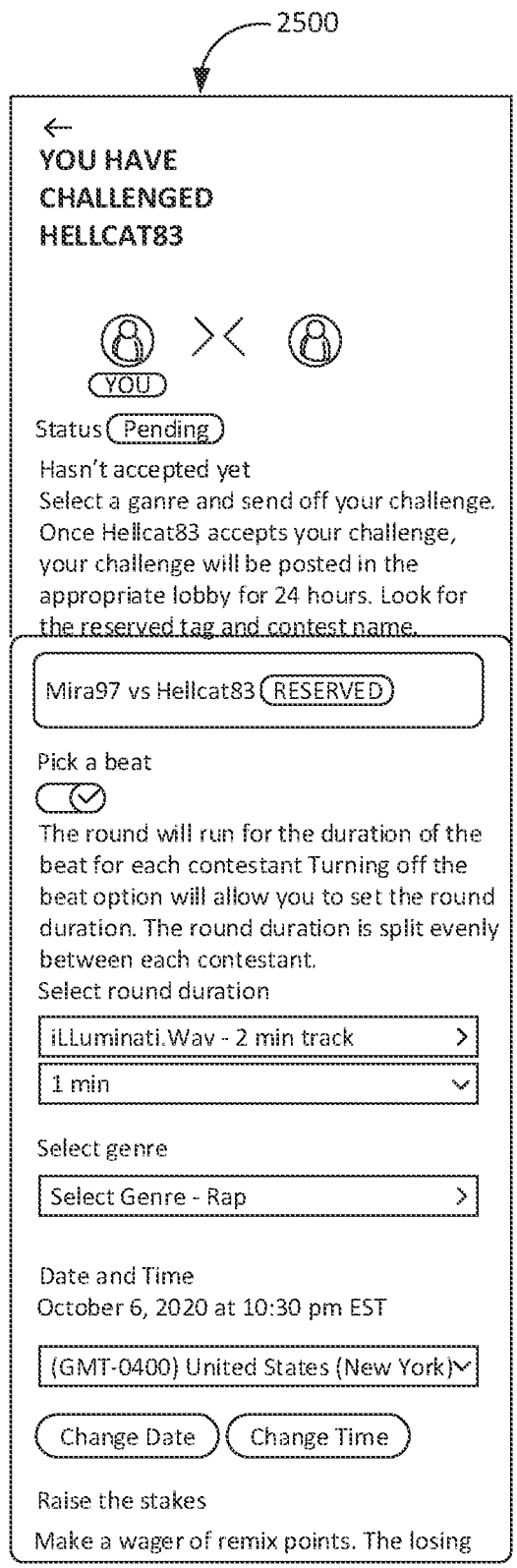
FIG. 25 illustrates a status screen of a software application for facilitating the conducting of the competition between the participants, in accordance with some embodiments.

FIG. 25 illustrates a status screen 2500 of a software application for facilitating the conducting of the competition between the participants, in accordance with some embodiments.

Figure 26:
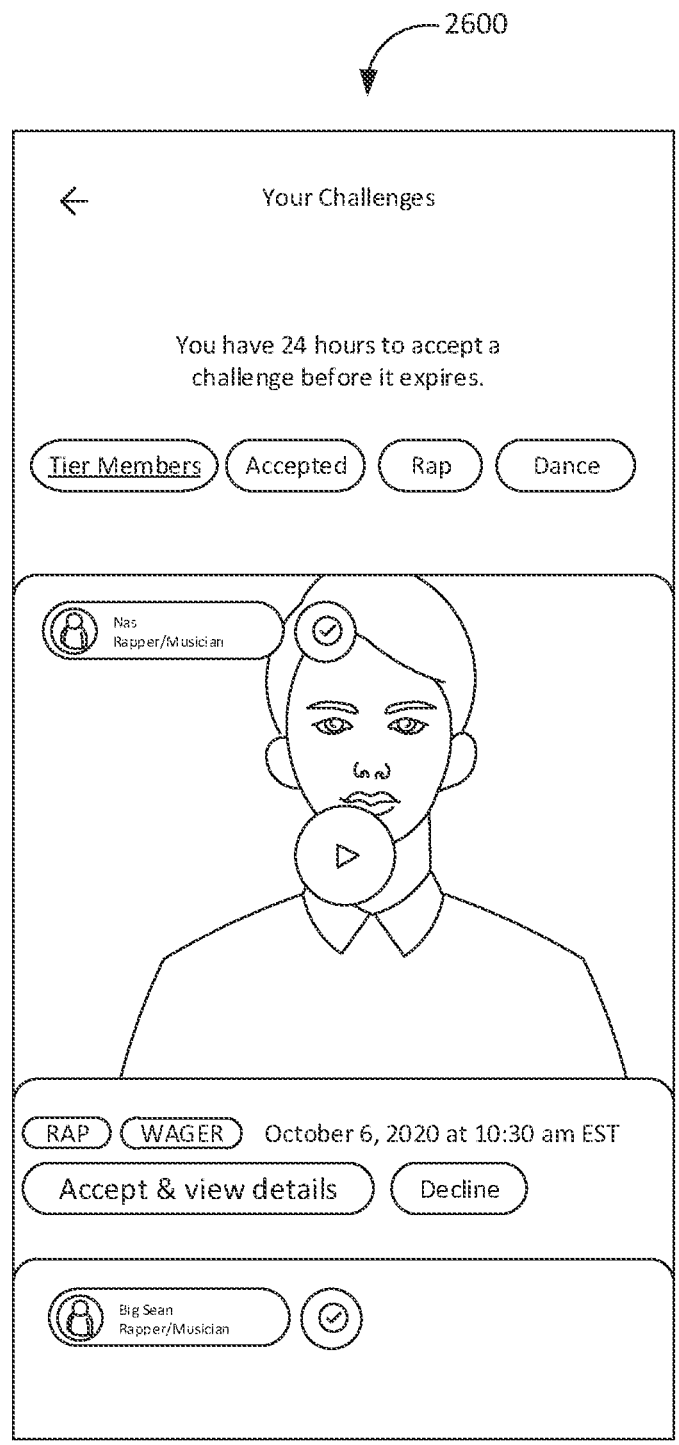
FIG. 26 illustrates a your challenges screen of the software application for facilitating the conducting of the competition between the participants, in accordance with some embodiments.

FIG. 26 illustrates a your challenges screen 2600 of the software application for facilitating the conducting of the competition between the participants, in accordance with some embodiments.

Figure 27:
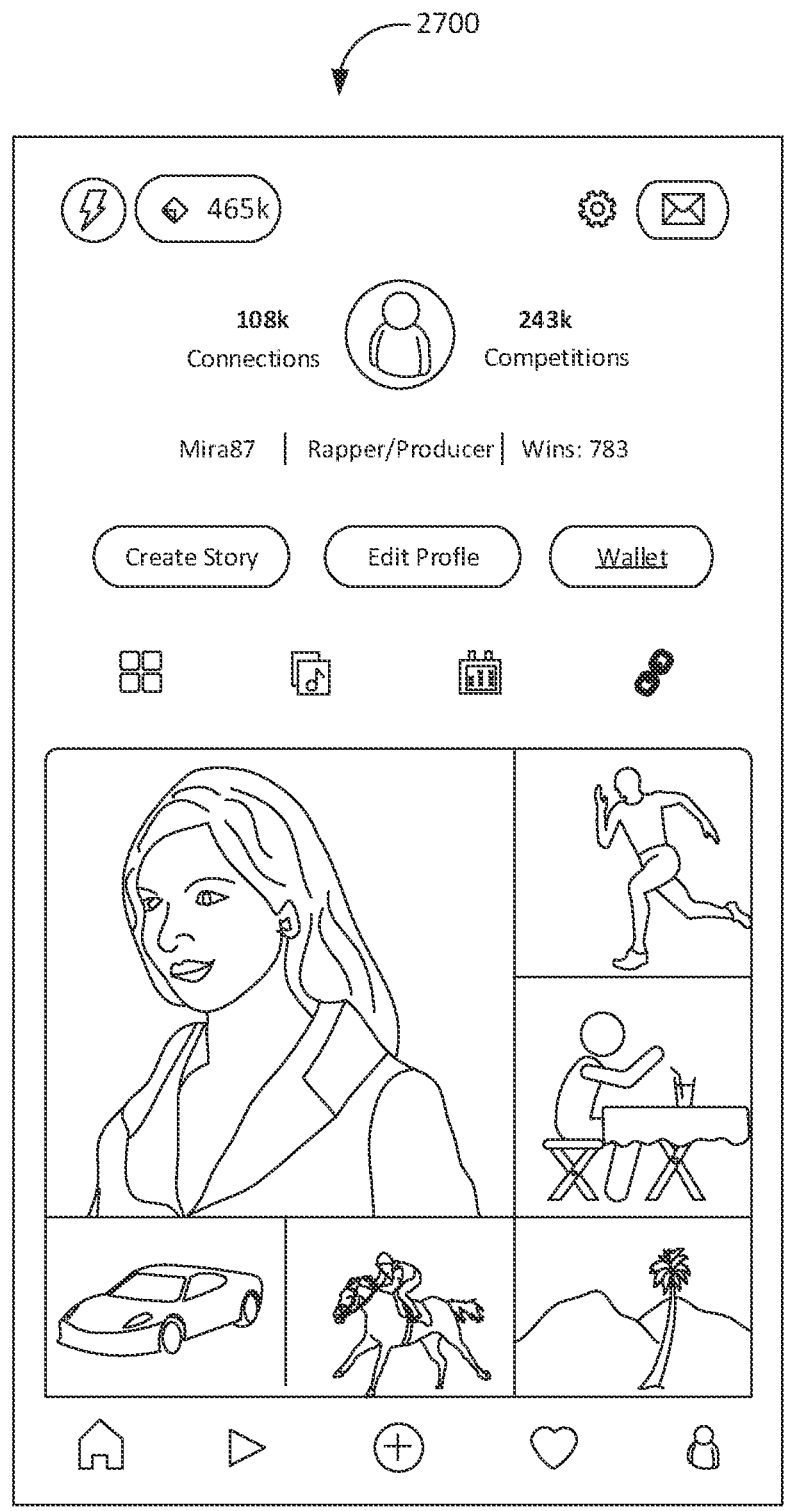
FIG. 27 illustrates a user screen of the software application for facilitating the conducting of the competition between the participants, in accordance with some embodiments.

FIG. 27 illustrates a user screen 2700 of the software application for facilitating the conducting of the competition between the participants, in accordance with some embodiments.

Figure 28:
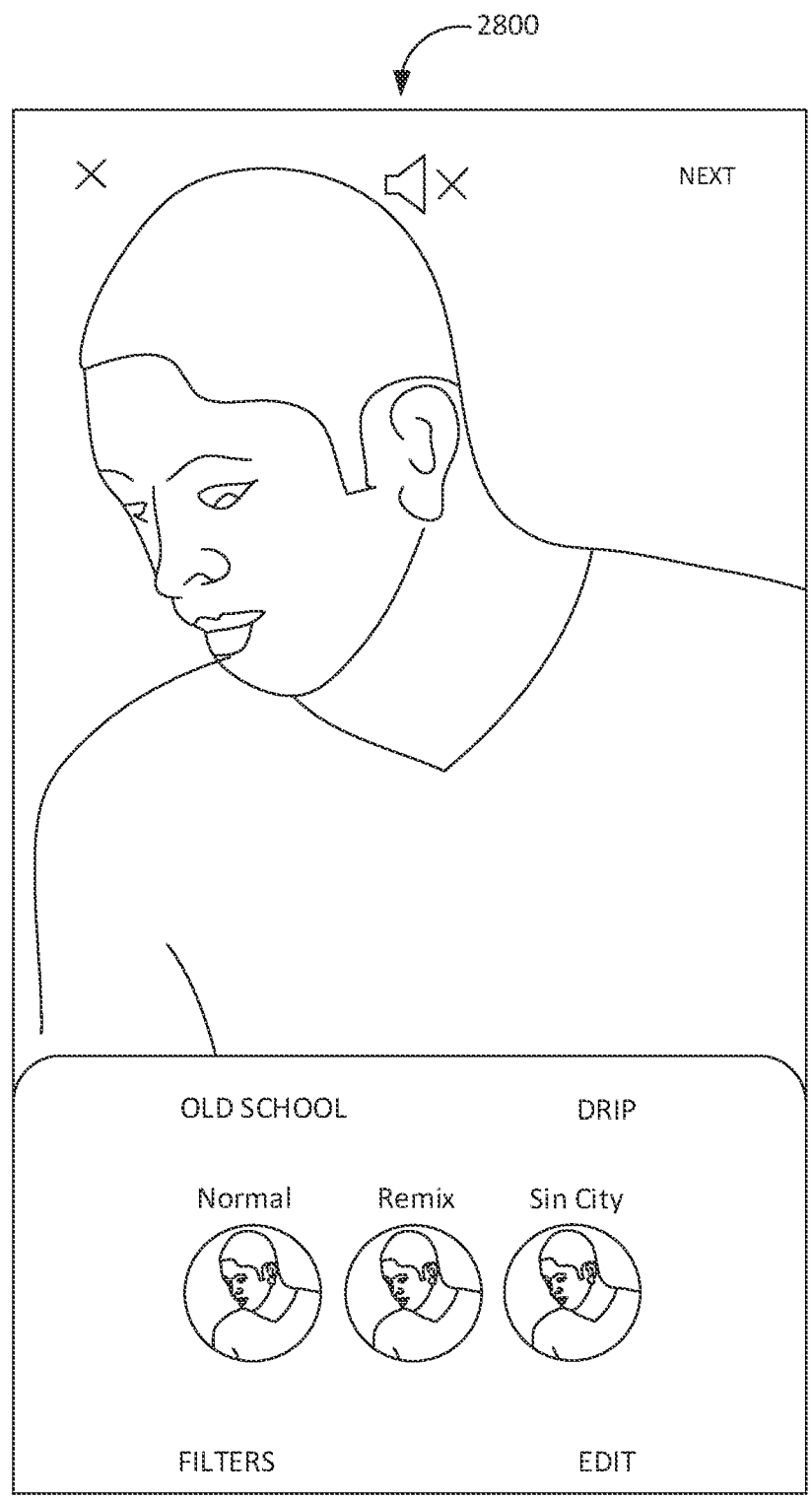
FIG. 28 illustrates a user screen of the software application for facilitating the conducting of the competition between the participants, in accordance with some embodiments.

FIG. 28 illustrates a user screen 2800 of the software application for facilitating the conducting of the competition between the participants, in accordance with some embodiments.

Figure 29:
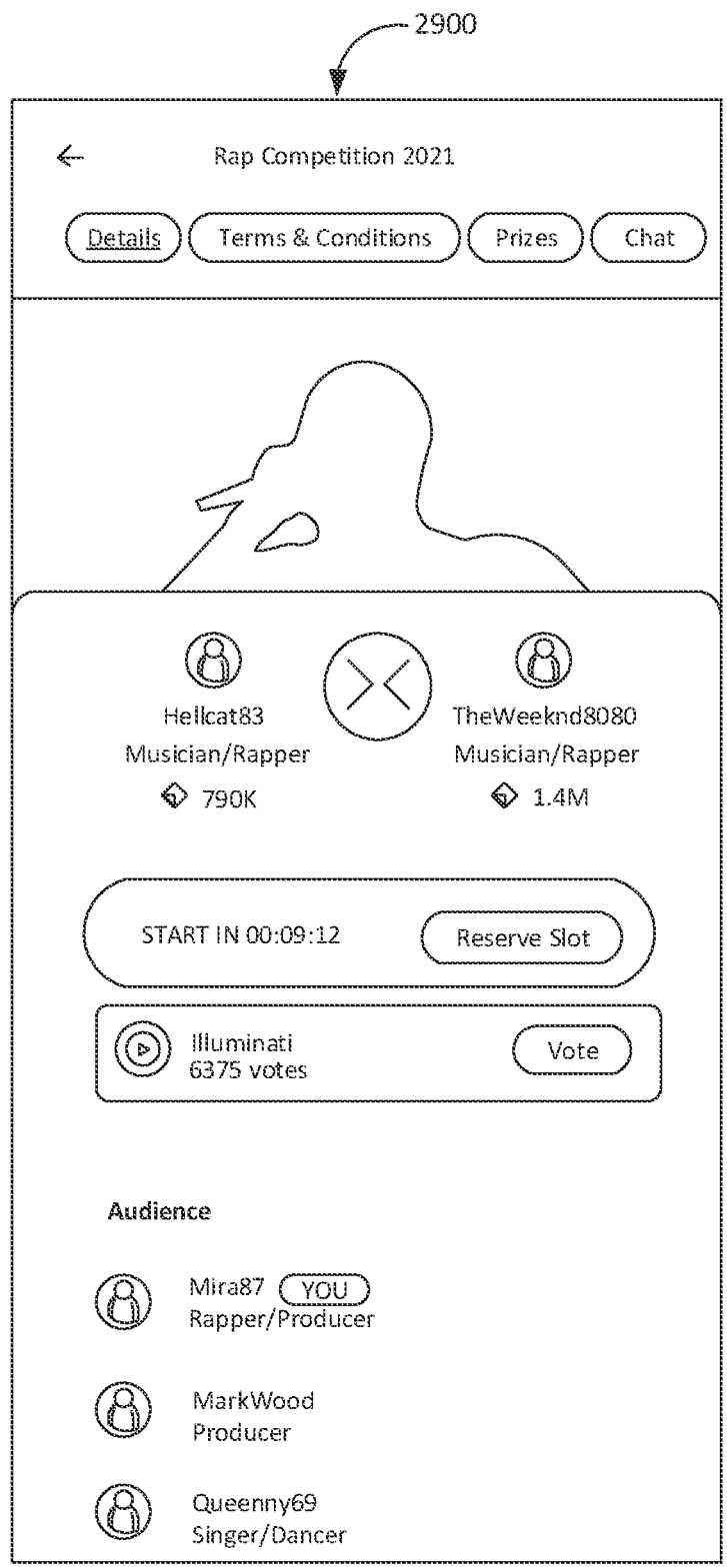
FIG. 29 illustrates a rap competition screen of the software application for facilitating the conducting of the competition between the participants, in accordance with some embodiments.

FIG. 29 illustrates a rap competition screen 2900 of the software application for facilitating the conducting of the competition between the participants, in accordance with some embodiments.

Figure 30:
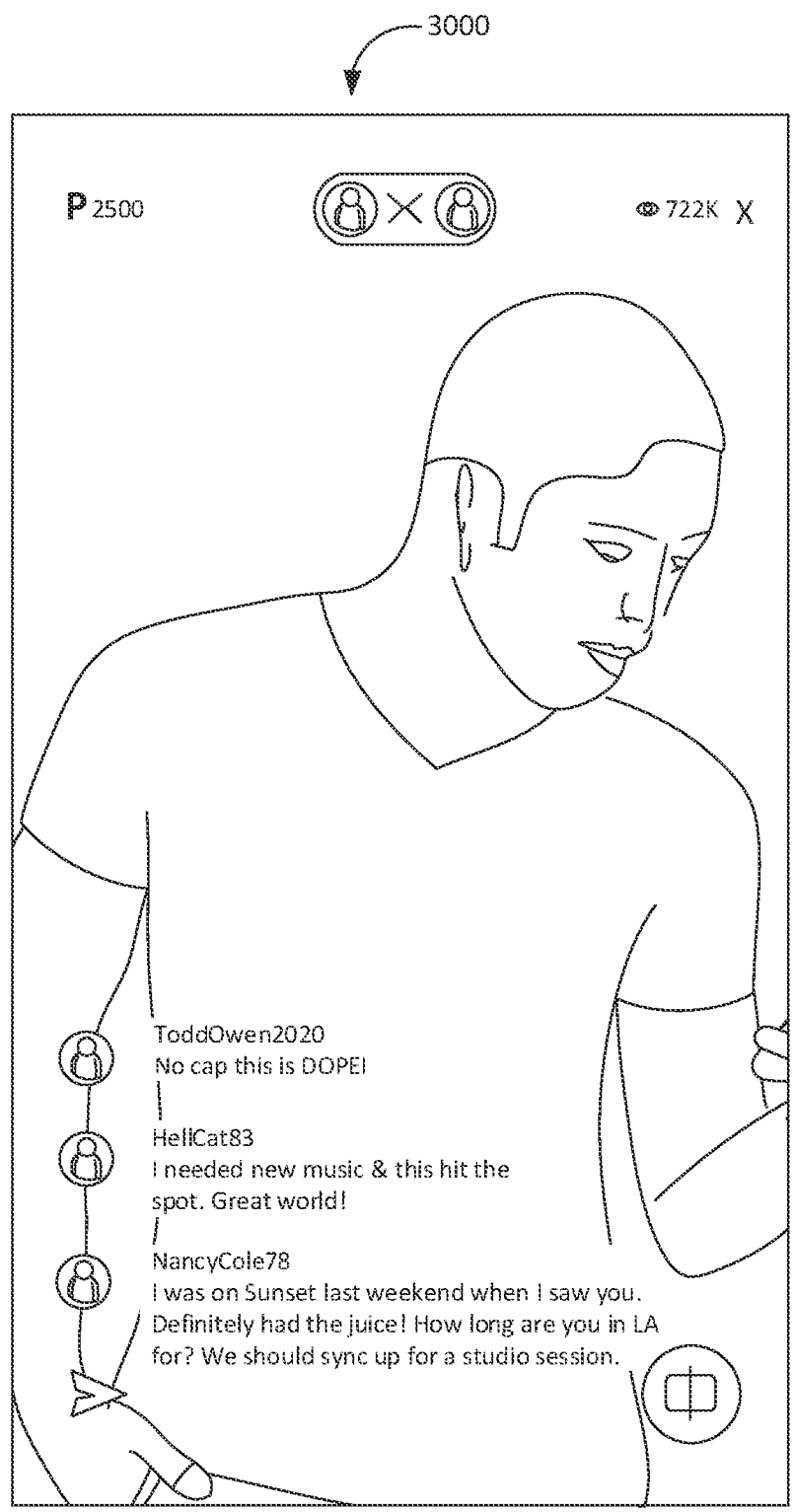
FIG. 30 illustrates a user screen of the software application for facilitating the conducting of the competition between the participants, in accordance with some embodiments.

FIG. 30 illustrates a user screen 3000 of the software application for facilitating the conducting of the competition between the participants, in accordance with some embodiments.

Figure 31:
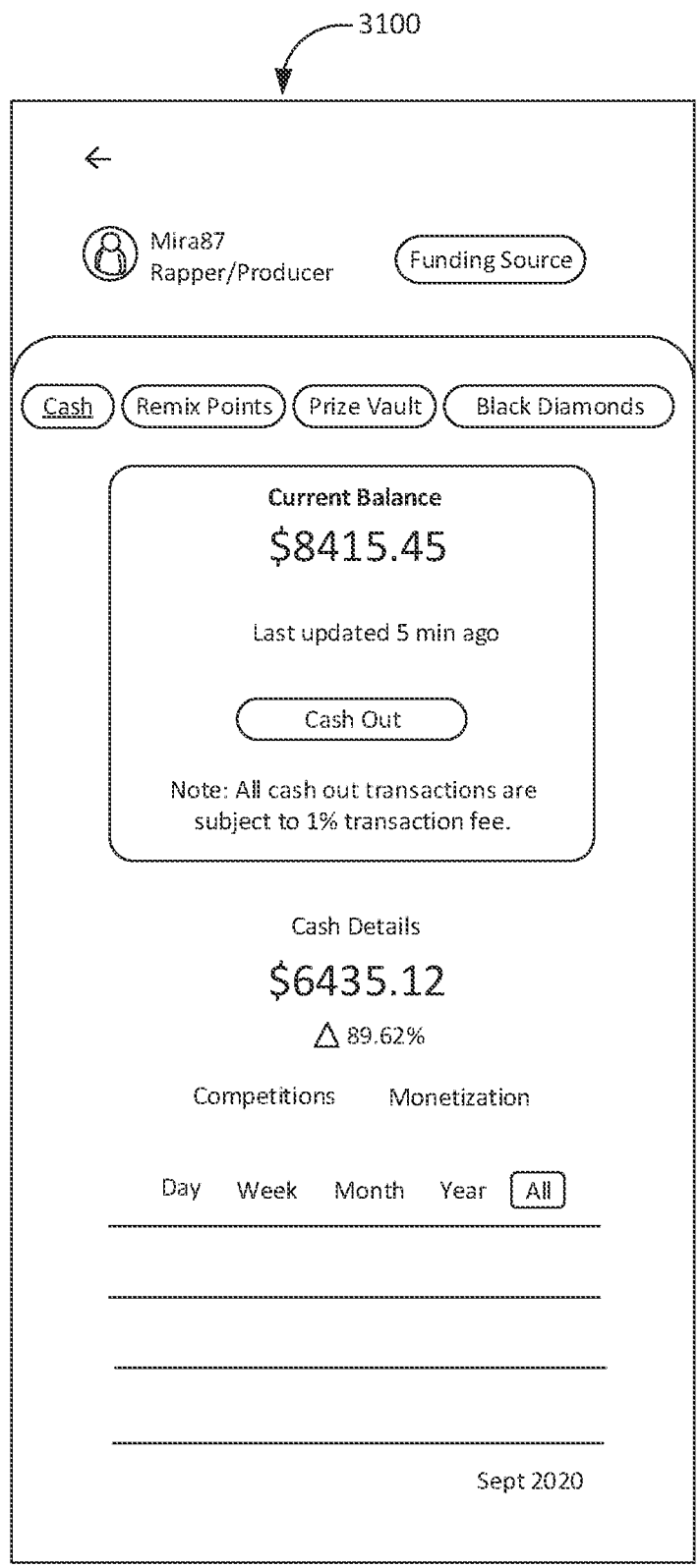
FIG. 31 illustrates a funding source screen of the software application for facilitating the conducting of the competition between the participants, in accordance with some embodiments.

FIG. 31 illustrates a funding source screen 3100 of the software application for facilitating the conducting of the competition between the participants, in accordance with some embodiments.

Figure 32:
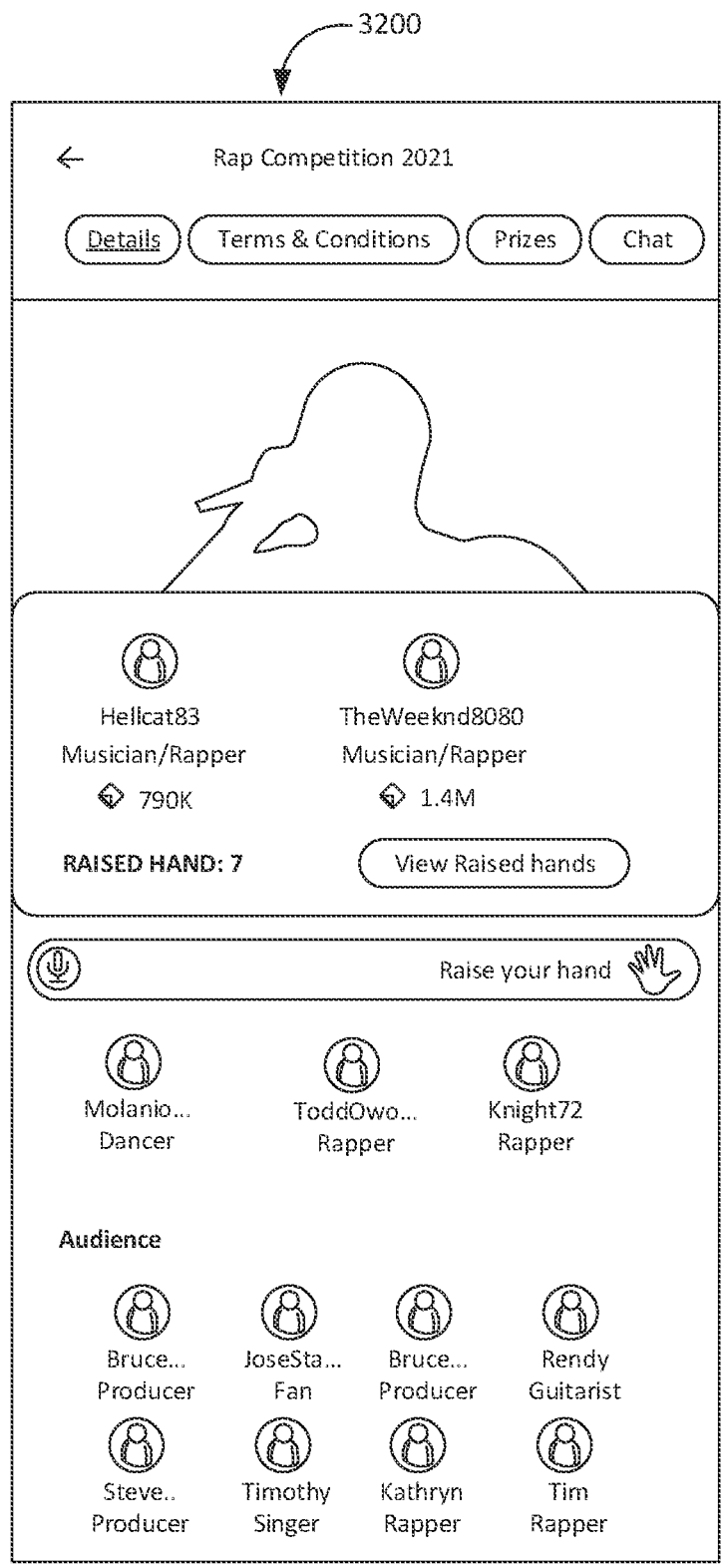
FIG. 32 illustrates a rap competition screen of the software application for facilitating the conducting of the competition between the participants, in accordance with some embodiments.

FIG. 32 illustrates a rap competition screen 3200 of the software application for facilitating the conducting of the competition between the participants, in accordance with some embodiments.

Figure 33:
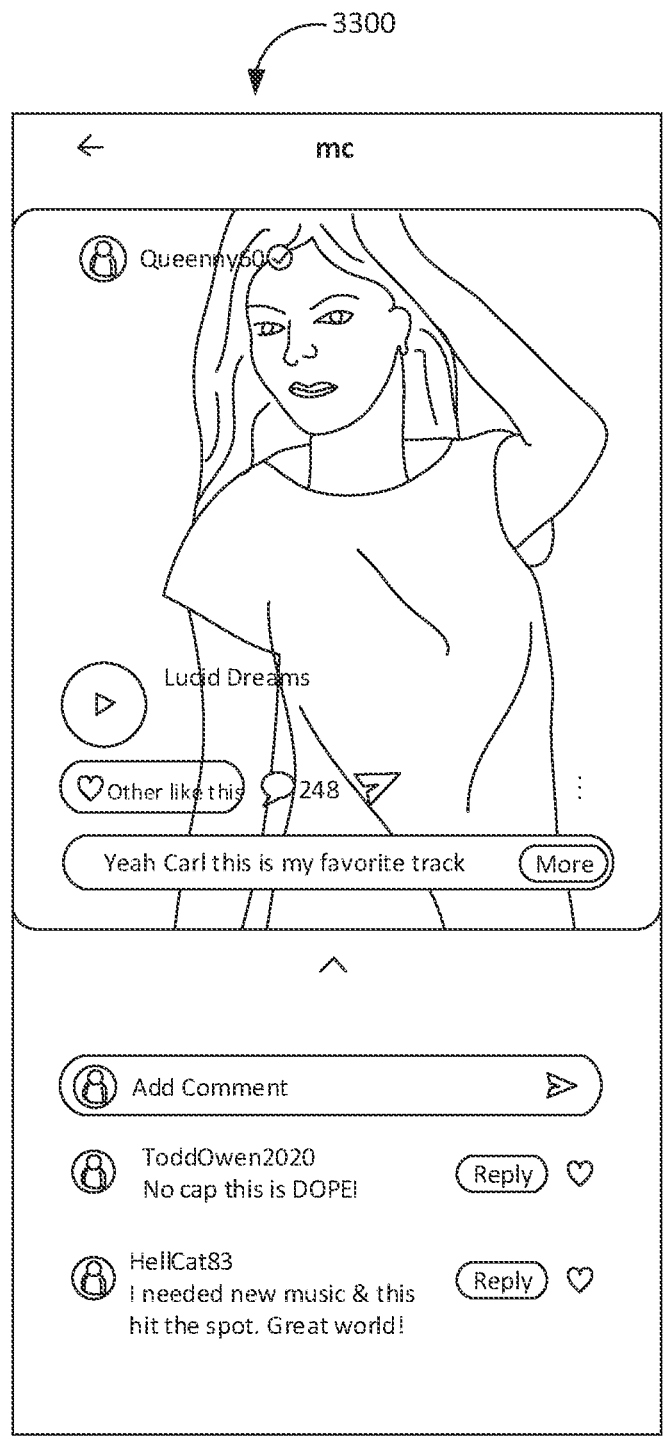
FIG. 33 illustrates a user screen of the software application for facilitating the conducting of the competition between the participants, in accordance with some embodiments.

FIG. 33 illustrates a user screen 3300 of the software application for facilitating the conducting of the competition between the participants, in accordance with some embodiments.

Figure 34:
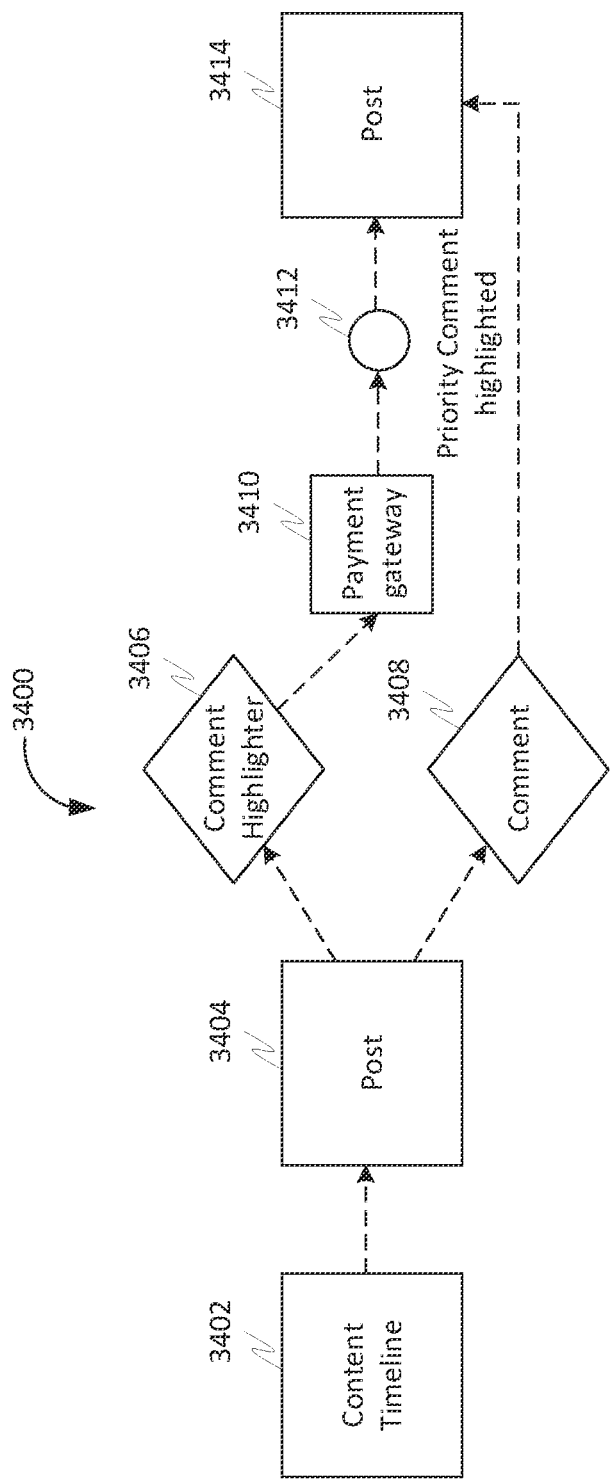
FIG. 34 illustrates a MC comment highlighter for facilitating highlighting of a comment, in accordance with some embodiments.

FIG. 34 illustrates a MC comment highlighter 3400 for facilitating highlighting of a comment, in accordance with some embodiments. Further, at 3402, the MC comment highlighter 3400 may include a content timeline. Further, at 3404, the MC comment highlighter 3400 may include a step of post. Further, at 3406, the MC comment highlighter 3400 may include a step of comment highlighter. Further, at 3408, the MC comment highlighter 3400 may include a step of comment. Further, at 3410, the MC comment highlighter 3400 may include a step of payment gateway. Further, at 3412, the MC comment highlighter 3400 may include a step of priority comment highlighted. Further, at 3414, the MC comment highlighter 3400 may include a step of post.

Figure 35:
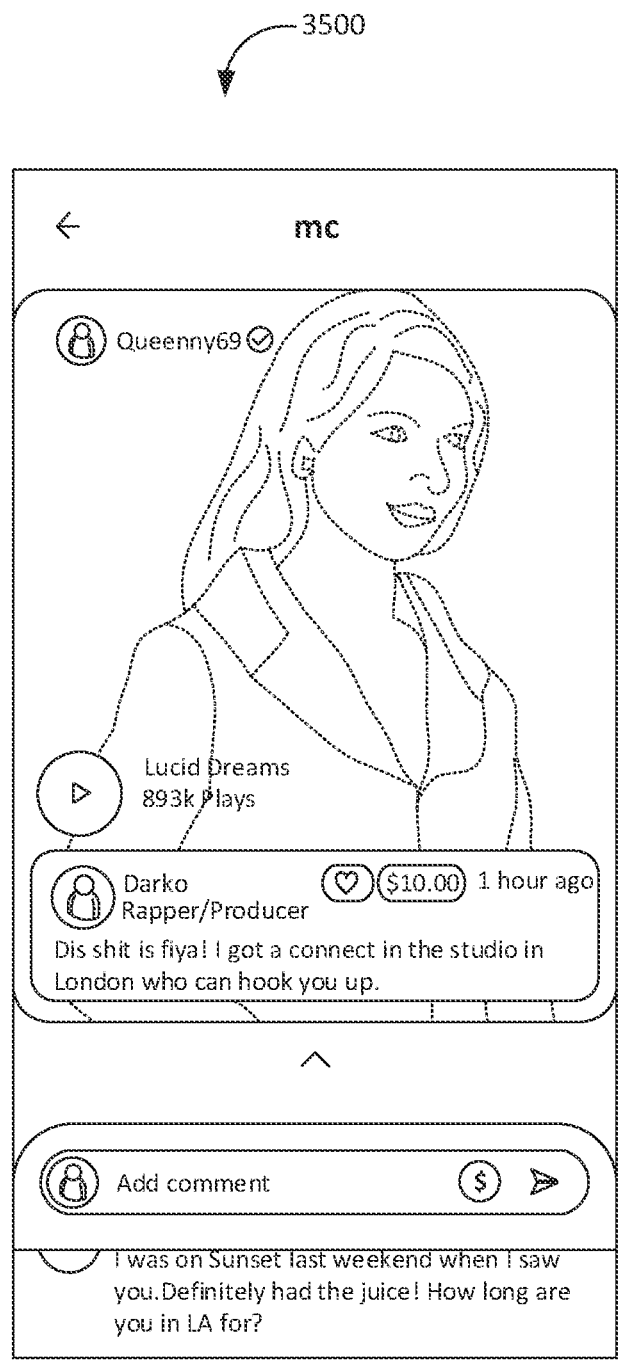
FIG. 35 illustrates an add comment screen of the software application for facilitating highlighting of the comment, in accordance with some embodiments.

FIG. 35 illustrates an add comment screen 3500 of the software application for facilitating highlighting of the comment, in accordance with some embodiments.

Figure 36:
FIG. 36 illustrates a send a comment highlighter screen of the software application for facilitating highlighting of the comment, in accordance with some embodiments.

FIG. 36 illustrates a send a comment highlighter screen 3600 of the software application for facilitating highlighting of the comment, in accordance with some embodiments.

Figure 37:
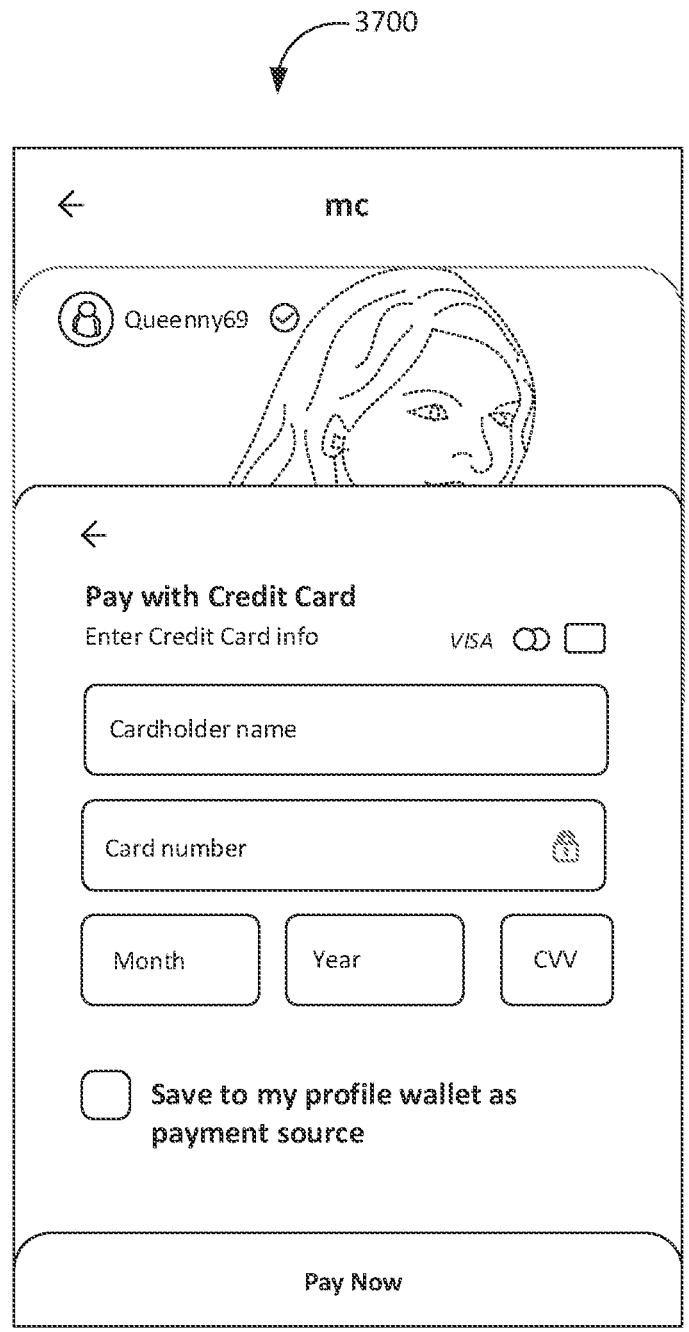
FIG. 37 illustrates a pay with credit card screen of the software application for facilitating highlighting of the comment, in accordance with some embodiments.

FIG. 37 illustrates a pay with credit card screen 3700 of the software application for facilitating highlighting of the comment, in accordance with some embodiments.

Figure 38:
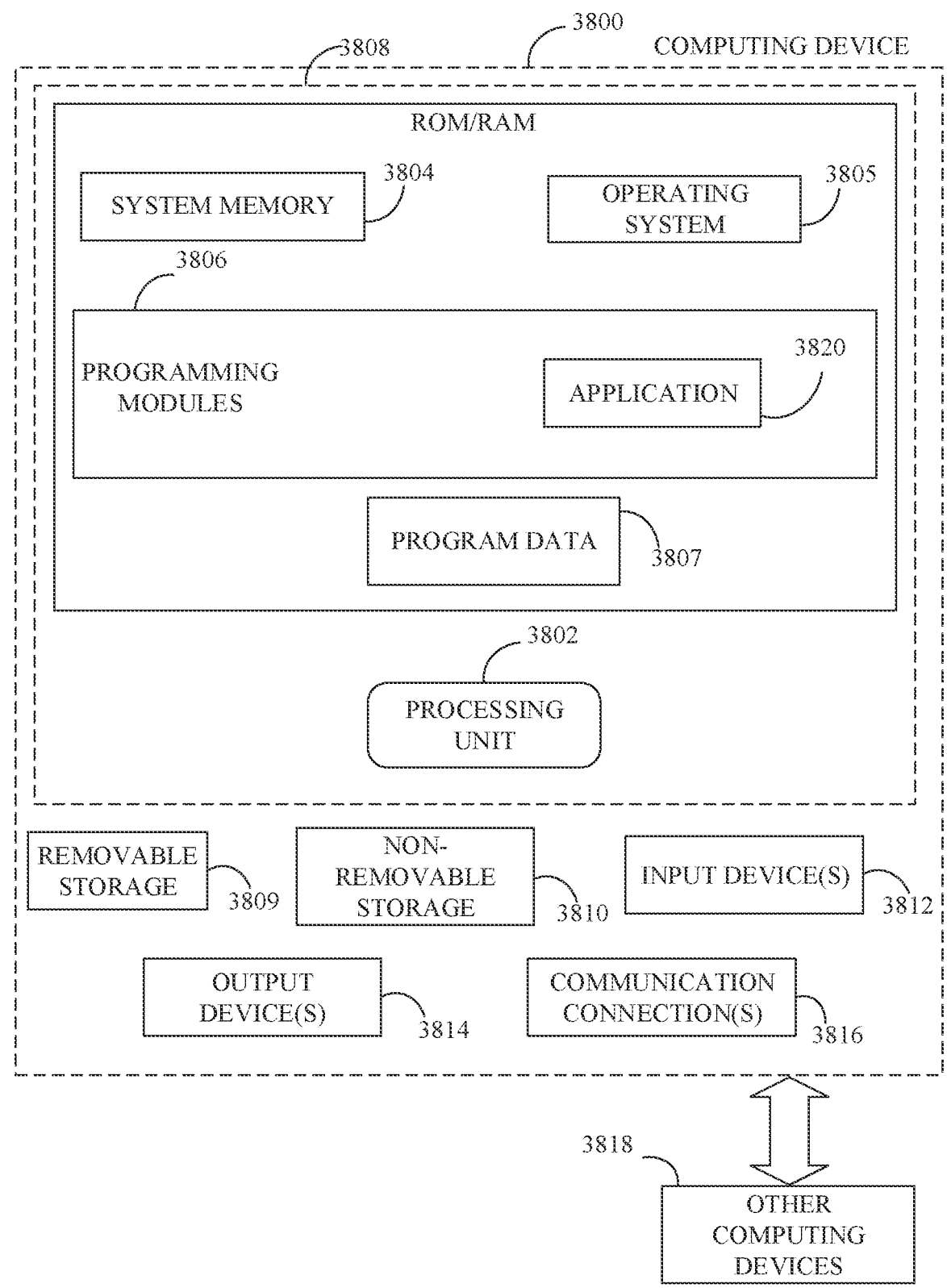
FIG. 38 is a block diagram of a computing device for implementing the methods disclosed herein, in accordance with some embodiments.

With reference to FIG. 38, a system consistent with an embodiment of the disclosure may include a computing device or cloud service, such as computing device 3800. In a basic configuration, computing device 3800 may include at least one processing unit 3802 and a system memory 3804. Depending on the configuration and type of computing device, system memory 3804 may comprise, but is not limited to, volatile (e.g. random-access memory (RAM)), non-volatile (e.g. read-only memory (ROM)), flash memory, or any combination. System memory 3804 may include operating system 3805, one or more programming modules 3806, and may include a program data 3807. Operating system 3805, for example, may be suitable for controlling computing device 3800's operation. In one embodiment, programming modules 3806 may include image-processing module, machine learning module. Furthermore, embodiments of the disclosure may be practiced in conjunction with a graphics library, other operating systems, or any other application program and is not limited to any particular application or system. This basic configuration is illustrated in FIG. 38 by those components within a dashed line 3808.

Computing device 3800 may have additional features or functionality. For example, computing device 3800 may also include additional data storage devices (removable and/or non-removable) such as, for example, magnetic disks, optical disks, or tape. Such additional storage is illustrated in FIG. 38 by a removable storage 3809 and a non-removable storage 3810. Computer storage media may include volatile and non-volatile, removable and non-removable media implemented in any method or technology for storage of information, such as computer-readable instructions, data structures, program modules, or other data. System memory 3804, removable storage 3809, and non-removable storage 3810 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 3800. Any such computer storage media may be part of device 3800. Computing device 3800 may also have input device(s) 3812 such as a keyboard, a mouse, a pen, a sound input device, a touch input device, a location sensor, a camera, a biometric sensor, etc. Output device(s) 3814 such as a display, speakers, a printer, etc. may also be included. The aforementioned devices are examples and others may be used.

Computing device 3800 may also contain a communication connection 3816 that may allow device 3800 to communicate with other computing devices 3818, such as over a network in a distributed computing environment, for example, an intranet or the Internet. Communication connection 3816 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 3804, including operating system 3805. While executing on processing unit 3802, programming modules 3806 (e.g., application 3820 such as a media player) may perform processes including, for example, one or more stages of methods, algorithms, systems, applications, servers, databases as described above. The aforementioned process is an example, and processing unit 3802 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Although the present disclosure has been explained in relation to its preferred embodiment, it is to be understood that many other possible modifications and variations can be made without departing from the spirit and scope of the disclosure.

What is claimed is:

1. A method for facilitating conducting a competition between participants, the method comprising:
receiving, using a communication device, a registration request from a participant device associated with a participant;
registering, using a processing device, the participant to the competition based on the registration request;
identifying, using the processing device, a plurality of first participants from a plurality of primary first participants associated with the competition;
receiving, using the communication device, location data associated with the participant from a location sensor, wherein the location sensor is configured for generating the location data based on a location of the participant;
analyzing, using the processing device, the location data, wherein the identifying of the plurality of first participants from the plurality of primary first participants is further based on the analyzing of the location data;
transmitting, using the communication device, a participant list comprising the plurality of first participants to the participant device;
receiving, using the communication device, a selection of at least one first participant of the plurality of first participants from the participant device, wherein the participant challenges the at least one first participant to the competition;
generating, using the processing device, a challenge notification for the competition between the participant and the at least one first participant based on the selection of the at least one first participant;
transmitting, using the communication device, the challenge notification to at least one first participant device associated with the at least one first participant;
receiving, using the communication device, a plurality of participant content associated with the participant from the participant device;
receiving, using the communication device, a plurality of first participant content associated with each first participant of the at least one first participant from each first participant device of the at least one first participant device;
analyzing, using the processing device, the plurality of participant content and the plurality of first participant content based on at least one artificial intelligence model;
selecting, using the processing device, at least one participant content from the plurality of participant content and at least one first participant content from the plurality of first participant content based on the analyzing of the plurality of participant content and the plurality of first participant content;
transmitting, using the communication device, the at least one participant content and the at least one first participant content to at least one viewer device associated with at least one viewer;
receiving, using the communication device, a score for each of the participant and the at least one first participant from the at least one viewer device;
analyzing, using the processing device, the score for each of the participant and the at least one first participant;
determining, using the processing device, a winner of the competition from the participant and the at least one first participant based on the analyzing of the score;
generating, using the processing device, a reward for the winner based on the determining; and
storing, using a storage device, the reward.

2. The method of claim 1, wherein the at least one viewer comprises at least one of the participant and the at least one first participant, wherein the transmitting of the at least one participant content and the at least one first participant content comprises transmitting the at least one participant content and the at least one first participant content to at least one of the participant device and the at least one first participant device.

3. The method of claim 2, wherein the receiving of the score for each of the participant and the at least one first participant from the at least one viewer device comprises receiving the score for each of the participant and the at least one first participant from at least one of the participant device and the at least one first participant device.

4. The method of claim 1 further comprising determining, using the processing device, a proximity between the participant and the plurality of primary first participants, wherein the identifying of the plurality of first participants from the plurality of primary first participants is further based on the determining of the proximity.

5. The method of claim 1, wherein the at least one viewer device is configured for presenting the at least one participant content and the at least one first participant content to the at least one viewer, wherein the at least one viewer device is configured for generating the score based on viewing the at least one participant content and the at least one first participant content by the at least one viewer.

6. The method of claim 5, wherein the at least one viewer device comprises at least one sensor, wherein the at least one sensor is configured for capturing at least one implicit feedback provided by the at least one viewer based on the viewing of the at least one participant content and the at least one first participant content, wherein the generating of the score is further based on the capturing of the at least one implicit feedback.

7. The method of claim 6, wherein the at least one sensor comprises a physiological sensor, wherein the physiological sensor is configured for capturing at least one physiological response of the at least one viewer, wherein the at least one implicit feedback comprises the at least one physiological response, wherein the generating of the score is further based on the capturing of the at least one physiological response.

8. The method of claim 6, wherein the at least one sensor comprises a physical sensor, wherein the physical sensor is configured for capturing at least one involuntary physical response of the at least one viewer, wherein the at least one implicit feedback comprises the at least one involuntary response, wherein the generating of the score is further based on the capturing of the at least one involuntary physical response.

9. The method of claim 1 further comprising:
analyzing, using the processing device, the at least one participant content and the at least one first participant content based on at least one first artificial intelligence model; and
determining, using the processing device, a number of points for each of the participant and the at least one first participant based on the analyzing of the at least one participant content and the at least one first participant content, wherein the determining of the winner of the competition from the participant and the at least one first participant is further based on the determining of the number of points.

10. A system for facilitating conducting a competition between participants, the system comprising:
a communication device configured for:
receiving a registration request from a participant device associated with a participant;
transmitting a participant list comprising a plurality of first participants to the participant device;
receiving a selection of at least one first participant of the plurality of first participants from the participant device, wherein the participant challenges the at least one first participant to the competition;
transmitting a challenge notification to at least one first participant device associated with the at least one first participant;
receiving a plurality of participant content associated with the participant from the participant device;
receiving a plurality of first participant content associated with each first participant of the at least one first participant from each first participant device of the at least one first participant device;
transmitting at least one participant content and at least one first participant content to at least one viewer device associated with at least one viewer; and
wherein the at least one viewer device comprises at least one sensor, wherein the at least one sensor is configured for capturing at least one implicit feedback provided by the at least one viewer based on the viewing of the at least one participant content and the at least one first participant content, wherein the generating of the score is further based on the capturing of the at least one implicit feedback;
receiving a score for each of the participant and the at least one first participant from the at least one viewer device;
a processing device communicatively coupled with the communication device, wherein the processing device is configured for:
registering the participant to the competition based on the registration request;
identifying the plurality of first participants from a plurality of primary first participants associated with the competition;
generating the challenge notification for the competition between the participant and the at least one first participant based on the selection of the at least one first participant;
analyzing the plurality of participant content and the plurality of first participant content based on at least one artificial intelligence model;
selecting the at least one participant content from the plurality of participant content and the at least one first participant content from the plurality of first participant content based on the analyzing of the plurality of participant content and the plurality of first participant content;
analyzing the score for each of the participant and the at least one first participant;
determining a winner of the competition from the participant and the at least one first participant based on the analyzing of the score; and
generating a reward for the winner based on the determining; and a storage device communicatively coupled with the processing device, wherein the storage device is configured for storing the reward.

11. The system of claim 10, wherein the at least one viewer comprises at least one of the participant and the at least one first participant, wherein the transmitting of the at least one participant content and the at least one first participant content comprises transmitting the at least one participant content and the at least one first participant content to at least one of the participant device and the at least one first participant device.

12. The system of claim 11, wherein the receiving of the score for each of the participant and the at least one first participant from the at least one viewer device comprises receiving the score for each of the participant and the at least one first participant from at least one of the participant device and the at least one first participant device.

13. The system of claim 10, wherein the communication device is further configured for receiving location data associated with the participant from a location sensor, wherein the location sensor is configured for generating the location data based on a location of the participant, wherein the processing device is further configured for analyzing the location data, wherein the identifying of the plurality of first participants from the plurality of primary first participants is further based on the analyzing of the location data.

14. The system of claim 13, wherein the processing device is further configured for determining a proximity between the participant and the plurality of primary first participants, wherein the identifying of the plurality of first participants from the plurality of primary first participants is further based on the determining of the proximity.

15. The system of claim 10, wherein the at least one viewer device is configured for presenting the at least one participant content and the at least one first participant content to the at least one viewer, wherein the at least one viewer device is configured for generating the score based on viewing the at least one participant content and the at least one first participant content by the at least one viewer.

16. The system of claim 15, wherein the at least one sensor comprises a physiological sensor, wherein the physiological sensor is configured for capturing at least one physiological response of the at least one viewer, wherein the at least one implicit feedback comprises the at least one physiological response, wherein the generating of the score is further based on the capturing of the at least one physiological response.

17. The system of claim 15, wherein the at least one sensor comprises a physical sensor, wherein the physical sensor is configured for capturing at least one involuntary physical response of the at least one viewer, wherein the at least one implicit feedback comprises the at least one involuntary response, wherein the generating of the score is further based on the capturing of the at least one involuntary physical response.

18. The system of claim 10, wherein the processing device is further configured for:
analyzing the at least one participant content and the at least one first participant content based on at least one first artificial intelligence model; and
determining a number of points for each of the participant and the at least one first participant based on the analyzing of the at least one participant content and the at least one first participant content, wherein the determining of the winner of the competition from the participant and the at least one first participant is further based on the determining of the number of points.

* * * * *